US008840455B2

(12) United States Patent
Osawa et al.

(10) Patent No.: US 8,840,455 B2
(45) Date of Patent: Sep. 23, 2014

(54) GAMING MACHINE HAVING PLURAL GAMING MODES

(75) Inventors: Akira Osawa, Tokyo (JP); Tatsuya Teranishi, Tokyo (JP); Takeshi Iso, Tokyo (JP); Kenta Kitamura, Tokyo (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 338 days.

(21) Appl. No.: 13/151,825

(22) Filed: Jun. 2, 2011

(65) Prior Publication Data

US 2012/0309493 A1 Dec. 6, 2012

(51) Int. Cl.
*A63F 9/24* (2006.01)
*A63F 13/00* (2014.01)
*G06F 17/00* (2006.01)
*G06F 19/00* (2011.01)

(52) U.S. Cl.
CPC .................................. *G06F 17/3267* (2013.01)
USPC .................... 463/20; 463/16; 463/22; 463/25

(58) Field of Classification Search
USPC .......................................... 463/16, 20, 22, 25
See application file for complete search history.

(56) References Cited

U.S. PATENT DOCUMENTS

2004/0048652 A1* 3/2004 Ching et al. .................... 463/20
2004/0214634 A1* 10/2004 Fasbender et al. .............. 463/25
2005/0059476 A1* 3/2005 Vancura .......................... 463/20
2008/0004102 A1* 1/2008 Kojima ........................... 463/20

* cited by examiner

*Primary Examiner* — Adetokunbo O Torimiro
(74) *Attorney, Agent, or Firm* — KMF Patent Services, PLLC; S. Peter Konzel; Kenneth M. Fagin

(57) ABSTRACT

A gaming machine which can control the tempo of the game to refresh the player while maintaining continuity of the game, enhancing entertainingness and amusement of the game, and encouraging the player's sense of achievements. The input unit receives an instruction related to a game. The memory stores a first symbol determination table causing that a specific symbol appears among rearranged symbols on the symbol display unit with a first probability and a second symbol determination table causing that the specific symbol appears among the rearranged symbols with a second probability higher than the first probability. The controller starts the game in response to the instruction received through the input unit to execute the game in a normal mode and shifting the normal mode to a chance mode according to the game result in the normal mode.

8 Claims, 28 Drawing Sheets

PROBABILITIES OF WINNING
BY 'CHERRY' AND 'SEVEN' COMBINATION

| SEQUENCE OF CHANCE MODE GAME | PROBABILITY OF CHERRY ( ) | PROBABILITY OF SEVEN ( 7 ) COMBINATION | PROBABILITY OF CONTINUATION |
|---|---|---|---|
| FIRST GAME | - | 1 / 21.7 | 95.39 % |
| SECOND GAME | 1 / 10.4 | 1 / 18.7 | 85.05 % |
| THIRD GAME | 1 / 6.6 | 1 / 15.1 | 78.27 % |
| FOURTH GAME | 1 / 4.9 | 1 / 12.8 | 71.68 % |
| FIFTH GAME | 1 / 3.8 | 1 / 11.3 | 64.90 % |
| SIXTH GAME | 1 / 3.7 | 1 / 9.5 | 62.12 % |
| SEVENTH GAME | 1 / 2.6 | 1 / 8.7 | 50.35 % |
| EIGHTH GAME | 1 / 1.5 | 1 / 3.1 | 0.00 % |

PROBABILITIES INCREAES
AS CHANCE MODE PROGRESSES

PROBABILITIES OF 'SEVEN' COMBINATIONS
ESTABLISHMEHT IN CHANCE MODE GAMES

| SEQUENCE OF CHANCE MODE GAME | 777 | 7777 | 77777 |
|---|---|---|---|
| FIRST GAME | 1/ 32.8 | 1 / 67.2 | 1 / 672.0 |
| SECOND GAME | 1 / 29.1 | 1 / 59.7 | 1 / 597.3 |
| THIRD GAME | 1 / 21.9 | 1 / 44.8 | 1 / 448.0 |
| FOURTH GAME | 1 / 20.4 | 1 / 41.8 | 1 / 418.1 |
| FIFTH GAME | 1 / 19.1 | 1 / 39.2 | 1 / 392.0 |
| SIXTH GAME | 1 / 14.3 | 1 / 29.4 | 1 / 294.0 |
| SEVENTH GAME | 1 / 11.3 | 1 / 23.2 | 1 / 232.3 |
| EIGHTH GAME | 1 / 4.6 | 1 / 9.5 | 1 / 94.5 |

FIG. 6
SYMBOL CODE TABLE
| SYMBOL CODE | FIRST COLUMN | SECOND COLUMN | THIRD COLUMN | FOURTH COLUMN | FIFTH COLUMN |
|---|---|---|---|---|---|
| 00 | BAR | BAR BAR | BAR | BAR BAR | BAR |
| 01 | 7 | 7 | 7 | 7 | 7 |
| 02 | BAR BAR BAR | BAR BAR BAR | BAR BAR BAR | BAR BAR BAR | BAR BAR BAR |
| 03 |  |  |  |  | 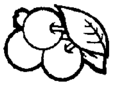 |
| 04 | BAR BAR | BAR | BAR BAR | BAR | BAR BAR |
| 05 | BAR BAR BAR | BAR BAR BAR |  | BAR BAR BAR | BAR BAR BAR |
| 06 | BAR BAR | BAR | BAR BAR | BAR | BAR BAR |
| 07 | 7 | 7 | 7 | 7 | 7 |
| 08 | BAR BAR | BAR | BAR BAR | BAR | BAR BAR |
| 09 | BAR | BAR BAR | BAR | BAR BAR | BAR |
| 10 | 7 | 7 | 7 | 7 | 7 |

SYMBOL CODE DETERMINATION TABLES

FIG. 11

| RANDOM NUMBER | | | | | | | SYMBOL CODE |
|---|---|---|---|---|---|---|---|
| NORMAL GAME | NORMAL GAME | ••• | 1ST CHANCE GAME | 1ST CHANCE GAME | ••• | 8ST CHANCE GAME | |
| COL NO.1 | COL NO.2 | ••• | COL NO.1 | COL NO.2 | ••• | COL NO.8 | |
| 0 – XXX | 0 – XXX | ••• | 0 – XXX | 0 – XXX | ••• | 0 – XXX | 00 |
| XXX – XXX | XXX – XXX | ••• | XXX – XXX | XXX – XXX | ••• | XXX – XXX | 01 |
| XXX – XXX | XXX – XXX | ••• | XXX – XXX | XXX – XXX | ••• | XXX – XXX | 02 |
| XXX – XXX | XXX – XXX | ••• | XXX – XXX | XXX – XXX | ••• | XXX – XXX | 03 |
| XXX – XXX | XXX – XXX | ••• | XXX – XXX | XXX – XXX | ••• | XXX – XXX | 04 |
| XXX – XXX | XXX – XXX | ••• | XXX – XXX | XXX – XXX | ••• | XXX – XXX | 05 |
| XXX – XXX | XXX – XXX | ••• | XXX – XXX | XXX – XXX | ••• | XXX – XXX | 06 |
| XXX – XXX | XXX – XXX | ••• | XXX – XXX | XXX – XXX | ••• | XXX – XXX | 07 |
| XXX – XXX | XXX – XXX | ••• | XXX – XXX | XXX – XXX | ••• | XXX – XXX | 08 |
| XXX – XXX | XXX – XXX | ••• | XXX – XXX | XXX – XXX | ••• | XXX – XXX | 09 |
| XXX – XXX | XXX – XXX | ••• | XXX – XXX | XXX – XXX | ••• | XXX – XXX | 10 |

SYMBOL APPPREARANCE PROBABLITY TABLES

FIG. 13

PAYOUT TABLES

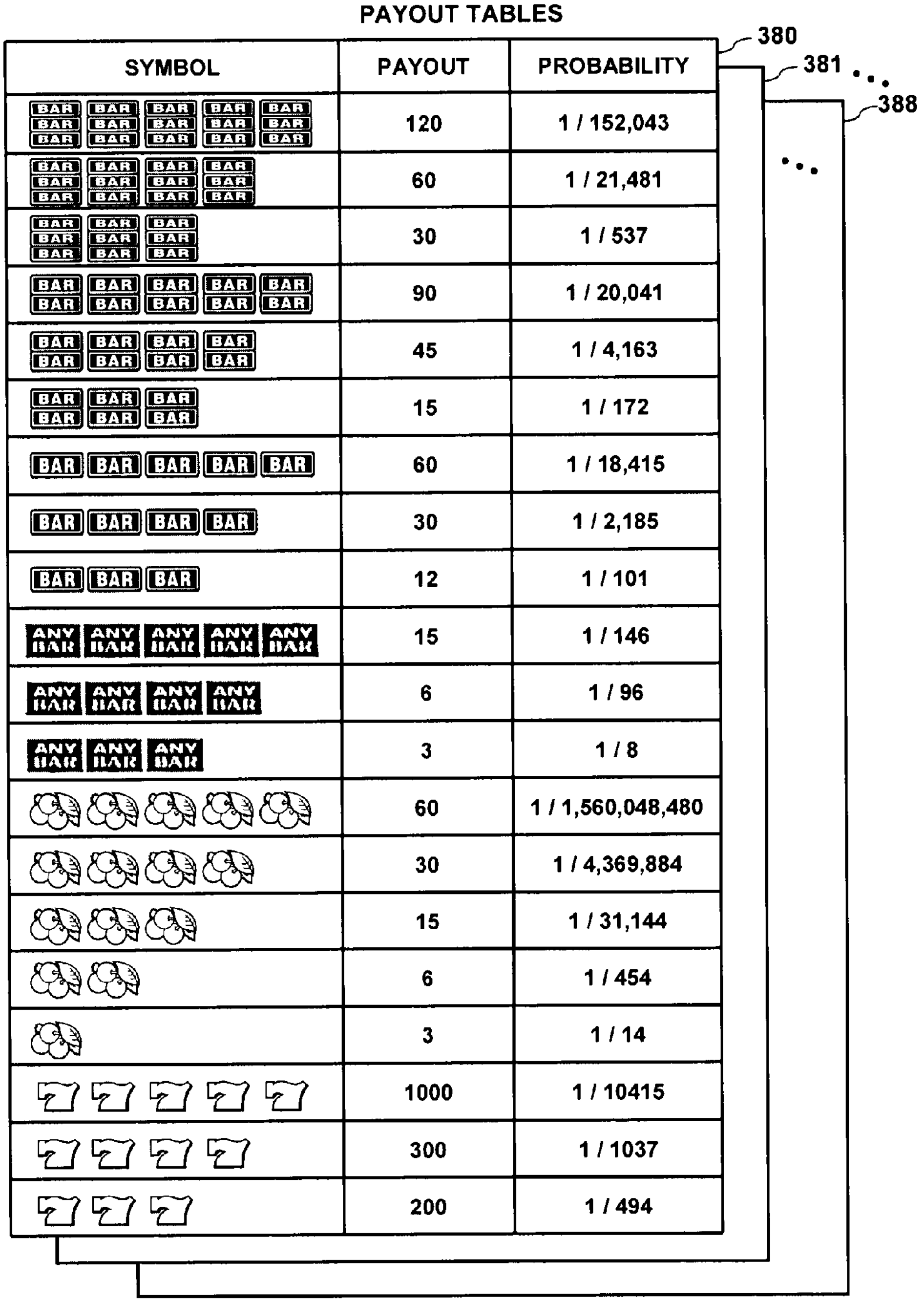

| SYMBOL | PAYOUT | PROBABILITY |
|---|---|---|
| BAR/BAR/BAR BAR/BAR/BAR BAR/BAR/BAR BAR/BAR/BAR BAR/BAR/BAR | 120 | 1 / 152,043 |
| BAR/BAR/BAR BAR/BAR/BAR BAR/BAR/BAR BAR/BAR/BAR | 60 | 1 / 21,481 |
| BAR/BAR/BAR BAR/BAR/BAR BAR/BAR/BAR | 30 | 1 / 537 |
| BAR/BAR BAR/BAR BAR/BAR BAR/BAR BAR/BAR | 90 | 1 / 20,041 |
| BAR/BAR BAR/BAR BAR/BAR BAR/BAR | 45 | 1 / 4,163 |
| BAR/BAR BAR/BAR BAR/BAR | 15 | 1 / 172 |
| BAR BAR BAR BAR BAR | 60 | 1 / 18,415 |
| BAR BAR BAR BAR | 30 | 1 / 2,185 |
| BAR BAR BAR | 12 | 1 / 101 |
| ANY BAR ANY BAR ANY BAR ANY BAR ANY BAR | 15 | 1 / 146 |
| ANY BAR ANY BAR ANY BAR ANY BAR | 6 | 1 / 96 |
| ANY BAR ANY BAR ANY BAR | 3 | 1 / 8 |
| | 60 | 1 / 1,560,048,480 |
| | 30 | 1 / 4,369,884 |
| | 15 | 1 / 31,144 |
| | 6 | 1 / 454 |
| | 3 | 1 / 14 |
| 7 7 7 7 7 | 1000 | 1 / 10415 |
| 7 7 7 7 | 300 | 1 / 1037 |
| 7 7 7 | 200 | 1 / 494 |

FIG. 14

PROBABILITIES OF WINNING
BY 'CHERRY' AND 'SEVEN' COMBINATION

| SEQUENCE OF CHANCE MODE GAME | PROBABILITY OF CHERRY ( ) | PROBABILITY OF SEVEN (7) COMBINATION | PROBABILITY OF CONTINUATION |
|---|---|---|---|
| FIRST GAME | - | 1 / 21.7 | 95.39 % |
| SECOND GAME | 1 / 10.4 | 1 / 18.7 | 85.05 % |
| THIRD GAME | 1 / 6.6 | 1 / 15.1 | 78.27 % |
| FOURTH GAME | 1 / 4.9 | 1 / 12.8 | 71.68 % |
| FIFTH GAME | 1 / 3.8 | 1 / 11.3 | 64.90 % |
| SIXTH GAME | 1 / 3.7 | 1 / 9.5 | 62.12 % |
| SEVENTH GAME | 1 / 2.6 | 1 / 8.7 | 50.35 % |
| EIGHTH GAME | 1 / 1.5 | 1 / 3.1 | 0.00 % |

PROBABILITIES INCREAES
AS CHANCE MODE PROGRESSES

PROBABILITIES OF 'SEVEN' COMBINATIONS
ESTABLISHMEHT IN CHANCE MODE GAMES

| SEQUENCE OF CHANCE MODE GAME | 777 | 7777 | 77777 |
|---|---|---|---|
| FIRST GAME | 1/ 32.8 | 1 / 67.2 | 1 / 672.0 |
| SECOND GAME | 1 / 29.1 | 1 / 59.7 | 1 / 597.3 |
| THIRD GAME | 1 / 21.9 | 1 / 44.8 | 1 / 448.0 |
| FOURTH GAME | 1 / 20.4 | 1 / 41.8 | 1 / 418.1 |
| FIFTH GAME | 1 / 19.1 | 1 / 39.2 | 1 / 392.0 |
| SIXTH GAME | 1 / 14.3 | 1 / 29.4 | 1 / 294.0 |
| SEVENTH GAME | 1 / 11.3 | 1 / 23.2 | 1 / 232.3 |
| EIGHTH GAME | 1 / 4.6 | 1 / 9.5 | 1 / 94.5 |

FIG. 22

SYMBOL CODE TABLE

| SYMBOL CODE | FIRST COLUMN | SECOND COLUMN | THIRD COLUMN | FOURTH COLUMN | FIFTH COLUMN |
|---|---|---|---|---|---|
| 00 | 7 | 7 | 7 | 7 | 7 |
| 01 | BAR BAR | BAR BAR BAR | BAR BAR | BAR BAR | BAR BAR |
| 02 | BAR BAR BAR | BAR | BAR BAR BAR | BAR BAR BAR | BAR BAR BAR |
| 03 |  |  |  | 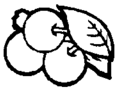 |  |
| 04 | BAR BAR BAR | BAR | BAR BAR BAR | BAR BAR BAR | BAR BAR BAR |
| 05 | BAR | BAR BAR BAR |  | BAR | BAR |
| 06 | BAR | BAR BAR | BAR BAR BAR | BAR | BAR |
| 07 | BAR BAR | BAR BAR | BAR BAR | BAR BAR | BAR BAR |
| 08 | WILD | WILD | WILD | WILD | WILD |
| 09 | BAR BAR | BAR BAR | BAR | BAR BAR | BAR BAR |
| 10 | BAR | BAR BAR BAR | BAR | BAR | BAR |

FIG. 23

PAYOUT TABLES

380A

381A

388A

| SYMBOL | PAYOUT | PROBABILITY |
|---|---|---|
| BAR BAR BAR BAR BAR BAR BAR BAR BAR BAR BAR BAR BAR BAR BAR | 120 | 1/195,570 |
| BAR BAR BAR BAR BAR BAR BAR BAR BAR BAR BAR BAR | 60 | 1/7,057 |
| BAR BAR BAR BAR BAR BAR BAR BAR BAR | 15 | 1/249 |
| BAR BAR BAR BAR BAR BAR BAR BAR BAR BAR | 90 | 1/3,417 |
| BAR BAR BAR BAR BAR BAR BAR BAR BAR BAR | 45 | 1/609 |
| BAR BAR BAR BAR BAR BAR BAR BAR BAR BAR | 9 | 1/84 |
| BAR BAR BAR BAR BAR | 60 | 1/2,721 |
| BAR BAR BAR BAR | 30 | 1/679 |
| BAR BAR BAR | 6 | 1/66 |
| ANY BAR ANY BAR ANY BAR ANY BAR ANY BAR | 15 | 1/43 |
| ANY BAR ANY BAR ANY BAR ANY BAR | 6 | 1/20 |
| ANY BAR ANY BAR ANY BAR | 3 | 1/5 |
| | 60 | 1/516,042,395 |
| | 30 | 1/1,847,404 |
| | 15 | 1/16,740 |
| | 6 | 1/308 |
| | 3 | 1/12 |
| | 240 | 1/128,812 |
| | 120 | 1/40,350 |
| | 60 | 1/9.678 |
| WILD WILD WILD WILD WILD | 2500 | 1/206,416,558 |
| WILD WILD WILD WILD | 1200 | 1/3,127,524 |
| WILD WILD WILD | 600 | 1/48,751 |

FIG. 25

| NUMBER OF 'WILD' SYMBOLS IN A PAY LINE IN WHICH A WINNING COMB. IS ESTABLISHED | PAYOUT AMOUNT |
|---|---|
| ONE 'WILD' SYMBOL | FIXED PAYOUT AMOUT FOR THE WINNING COMBINATION |
| TWO 'WILD' SYMBOLS | FIXED PAYOUT AMOUNT MULTIPLIED BY 2 |
| THREE 'WILD' SYMBOLS | FIXED PAYOUT AMOUNT MULTIPLIED BY 4 |
| FOUR 'WILD' SYMBOLS | FIXED PAYOUT AMOUNT MULTIPLIED BY 5 |
| FIVE 'WILD' SYMBOLS | NO MULTIPLICATION, BUT TOP PAYOUT, INSTEAD |

FIG. 26

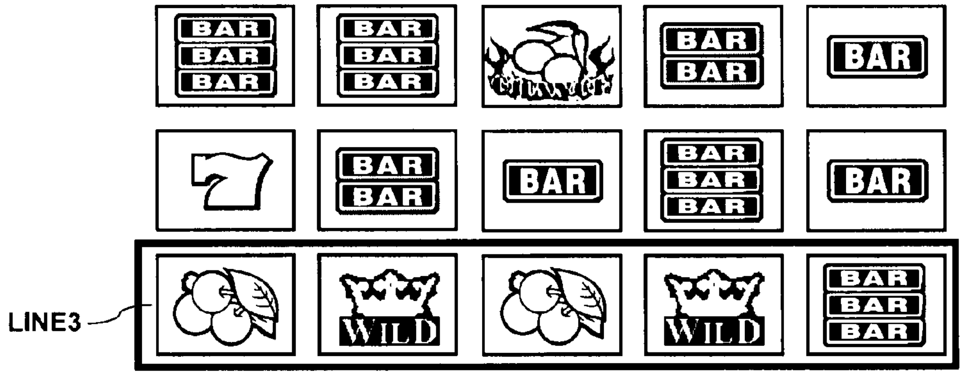

PAYOUT OF 'TWO CHERRIES' COMBINATION: 6

MULTIPLICATION FACTOR OWING TO 2 'WILD' SYMBOLS: 2

⇒ ACTUAL PAYOUT: 12

FIG. 27

PROBABILITIES OF "WILD" SYMBOL-RELATEDCOMBINATIONS ESTABLISHMEHT IN CHANCE MODE GAMES

| SEQUENCE OF CHANCE MODE GAME | THREE 'WILD'S | FOUR 'WILD'S | FIVE 'WILD'S | THREE 'SEVEN'S | FOUR 'SEVEN'S | FIVE 'SEVEN'S |
|---|---|---|---|---|---|---|
| FIRST GAME | 1 / 147.9 | 1/3,759.5 | 1/143,093.7 | 1 / 28.6 | 1 / 67.2 | 1 / 1,560.1 |
| SECOND GAME | 1 / 138.6 | 1/3,593.9 | 1/141,792.9 | 1 / 28.5 | 1 / 59.7 | 1 / 1,545.9 |
| THIRD GAME | 1 / 134.6 | 1/3,547.8 | 1/141,436.2 | 1 / 27.7 | 1 / 44.8 | 1 / 1,542.0 |
| FOURTH GAME | 1 / 131.9 | 1/3,515.5 | 1/134,586.7 | 1 / 27.0 | 1 / 41.8 | 1 / 1,467.3 |
| FIFTH GAME | 1 / 130.7 | 1/3,488.0 | 1/127,824.7 | 1 / 26.8 | 1 / 39.2 | 1 / 1,358.3 |
| SIXTH GAME | 1 / 128.3 | 1/3,450.9 | 1/124,590.2 | 1 / 26.3 | 1 / 29.4 | 1 / 1,343.7 |
| SEVENTH GAME | 1 / 125.9 | 1/3,449.7 | 1/123,242.7 | 1 / 25.8 | 1 / 23.2 | 1 / 1,317.0 |
| EIGHTH GAME | 1 / 53.7 | 1/627.5 | 1/11,546.9 | 1 / 2.8 | 1 / 10.2 | 1 / 54.2 |

⇩

PROBABILITIES OF WINNING BY 'CHERRY', 'WILD' AND 'SEVEN' COMBINATION

| SEQUENCE OF CHANCE MODE GAME | PROBABILITY OF 'CHERRY' COMBINATION | PROBABILITY OF 'WILD' COMBINATION | PROBABILITY OF 'SEVEN' COMBINATION | PROBABILITY OF CONTINUATION |
|---|---|---|---|---|
| FIRST GAME | - | 1 / 142.2 | 1 / 24.7 | 95.24 % |
| SECOND GAME | 1 / 13.9 | 1 / 133.3 | 1 / 24.7 | 88.01 % |
| THIRD GAME | 1 / 10.3 | 1 / 129.5 | 1 / 23.9 | 85.39 % |
| FOURTH GAME | 1 / 5.9 | 1 / 127.1 | 1 / 23.6 | 77.99 % |
| FIFTH GAME | 1 / 4.0 | 1 / 125.9 | 1 / 23.3 | 69.76 % |
| SIXTH GAME | 1 / 2.9 | 1 / 123.6 | 1 / 22.9 | 60.32 % |
| SEVENTH GAME | 1 / 2.2 | 1 / 131.3 | 1 / 22.5 | 49.89 % |
| EIGHTH GAME | 1 / 2.0 | 1 / 49.2 | 1 / 2.1 | - |

FIG. 28

PROBABILITIES OF "WILD" SYMBOL APPEARANCE

| GAMING MODE | FIRST GAME | SECOND GAME | THIRD GAME | FOURTH GAME | FIFTH GAME |
|---|---|---|---|---|---|
| CHANCE MODE | 1 / 2.7 | 1 / 3.2 | 1 / 3.0 | 1 / 8.7 | 1 / 11.7 |
| NORMAL MODE | 1 / 17.1 | 1 / 21.2 | 1 / 23.3 | 1 / 22.4 | 1 / 22.3 |

GAMING MACHINE HAVING PLURAL GAMING MODES

BACKGROUND OF THE INVENTION

1. Field of the Invention

The present invention relates to a gaming machine and, more particularly, to a gaming machine which rearranges symbols in each game and awards a benefit when a winning pattern is established in the rearranged symbols.

2. Description of Related Arts

A slot machine is a gaming machine that rotates reels to rearrange symbols displayed on a display area each time a game player initiates a game by pressing a button disposed one a control panel. When a winning pattern is established on the display area, the machine awards a benefit (e.g., payout) to the player. One example of such a gaming machine is disclosed in U.S. Pat. No. 4,097,048 issued 27 Jun. 1978 to Freddy Poulsen, et al. and entitled SLOT MACHINE.

In consideration of players' diversified preferences, there have been developed a variety of slot machines which differ in appearances, the symbol patterns, gaming scenarios, side effects such as background sound and additional visual display, and reel spinning schemes. For example, in U.S. Pat. No. 4,508,345 issued 2 Apr. 1985 and entitled SLOT MACHINE WITH PLAYER-FRIENDLY BONUS GAME, Okada discloses a slot machine implementing a bonus game. U.S. Pat. No. 7,942,733 issued 17 May 2011 and entitled SLOT MACHINE THAT SETS FREE GAME WHEN PREDETERMINED CONDISION IS SATISFIED discloses a slot machine enabling the user to enjoy a free game under a certain condition. U.S. Pat. No. 7,871,327 issued 18 Jan. 1011 and entitled METHODS AND APPARATUS FOR PROVIDING ENTERTAINMENT CONTENT AT A GAMING DEVICE discloses a slot machine allowing the player to access television program, web sites, or pay-per-view services.

SUMMARY OF THE INVENTION

However, the feeling or attitude for such additional features is not the same for everybody. While some players fully enjoy the additional features, the other players may feel irksome for the functions because such variations can break the progress of the game and degrade their immersion into the main game. Thus, it is desirable under certain circumstances that the additional feature does not break the progress of the main game so as to keep the player entertaining the main game. On the other hand, it is preferable to control the tempo of the game to refresh the player and cheer up the play's amusement or sense of achievements while maintaining the continuity of the game.

To solve the problems above, the object of the present invention is to provide a gaming machine which can control the tempo of the game to refresh the player while maintaining continuity of the game, enhancing entertainingness and amusement of the game, and encouraging the player's sense of achievements.

According to an aspect of the present invention, the gaming machine for achieving the above object includes a symbol display unit, an input unit, a memory, and a controller. The symbol display unit is capable of displaying a game result by rearranging a plurality of symbols. The input unit receives an instruction related to a game. The memory stores a first symbol determination table causing that a specific symbol appears among rearranged symbols on the symbol display unit with a first probability and a second symbol determination table causing that the specific symbol appears among the rearranged symbols with a second probability higher than the first probability. The controller starts the game in response to the instruction received through the input unit to execute the game in a normal mode and shifting the normal mode to a chance mode according to the game result in the normal mode.

The controller is programmed to execute processing of:

(A) when the game result in the normal mode satisfies a shifting condition, executing a first chance mode game based on the first symbol determination table;

(B) when the specific symbol appears in an awardable form among the rearranged symbols in the first chance mode game executed in the processing (A), awarding a benefit and terminating the chance mode;

(C) when the specific symbol does not appear in the awardable form in the first chance mode game executed in the processing (A), executing a subsequent chance mode game based on the second symbol determination table; and (D) when the specific symbol appears in the awardable form among the rearranged symbols in the subsequent chance mode game executed in the processing (C), awarding the benefit and terminating the chance mode.

Preferably, the controller can repetitively perform the processing (C) to execute the subsequent chance mode games within a predetermined number of times until the specific symbol appears in the awardable form. In such a case, it is preferable that the second symbol determination table includes a predetermined number of mapping rules, each for respective subsequent chance mode games, between random numbers and symbol codes. It is preferable that the second probability increases higher and higher as a new subsequent chance mode game is executed.

The awardable form may include a winning combination containing the specific symbol, a predetermined number of the specific symbols, or a combination thereof.

Preferably, the symbol display unit includes a transparent window protecting the symbol display unit and indicating a possible position of the specific symbol that establishes the awardable form. More preferably, transparent window indicates at least one active pay line.

According to an aspect of the present invention, the gaming machine for achieving the above object includes a symbol display unit, an input unit, a memory, and a controller. The symbol display unit is capable of displaying a game result by rearranging a plurality of symbols. The input unit receives an instruction related to a game. The memory stores a first symbol determination table bringing about first probabilities of at least two specific symbols which establish bases for awardable forms and result in respective benefits different from each other, a second symbol determination table bringing about second probabilities of the specific symbols higher than respective one of the first probabilities and involving a case that the specific symbols do not establish the awardable forms after an rearrangement of the symbols, and a third symbol determination table bringing about third probabilities of the specific symbols higher respective one of the second probabilities and guaranteeing one of the awardable forms after the rearrangement of the symbols. The controller starts the game in response to the instruction received through the input unit to execute the game in a normal mode, and sets a counter and shifts the normal mode to a chance mode according to the game result in the normal mode to execute the games in the chance mode according to a game count set by the counter.

The controller is programmed to execute processing of:

(A) when the game result in the normal mode satisfies a shifting condition, executing a first chance mode game based on the first symbol determination table;

(B) when at least one of the specific symbols appears in one of the awardable forms among the rearranged symbols in the first chance mode game executed in the processing (A), awarding a benefit and determining that a first termination condition is established to terminate the chance mode;

(C) when none of the specific symbols appear in the awardable forms in the first chance mode game executed in the processing (A) and the game count does not reach a final value, executing a subsequent chance mode game based on the second symbol determination table;

(D) when at least one of the specific symbol appears in one of the awardable forms in the subsequent chance mode game executed in the processing (C), awarding the benefit and determining that the first termination condition is established to terminate the chance mode; and (E) when the game count reached the final value, determining that a second termination condition is established and executing a final chance mode game based on the third symbol determination table to rearrange the symbols.

In a more general aspect, the present invention provides a gaming machine comprising: a symbol display unit for displaying a plurality of symbols including a specific symbol; a memory for storing plural kinds of data including data controlling appearance probability of the specific symbol, and program for executing a game; and a controller for reading out the plural kinds of data from the memory, executing a common game based on read-out data, and executing a continuation game depending on a result of the common game with an appearance probability of the specific symbol higher than the common game. The controller temporarily increases the appearance probability of the specific symbol as a number of executed continuation games increases.

Further, the present invention provisionally contemplates a gaming machine comprising:

a symbol display unit for displaying a plurality of symbols including a specific symbol capable of generating winning combinations and a WILD symbol capable of replacing the specific symbol;

a memory for storing data controlling appearance probabilities of the symbols, program for executing a game, data for determining fixed payout amount according to a number of symbols contained in a symbol combination consisting of the specific symbol and the WILD symbol and displayed in an awardable form, and data related with a multiplication factor to be multiplied to the fixed payout amount depending on the number of the WILD symbol displayed in a predetermined manner; and a CPU reading out data from the memory, executing a common game based on read-out data, and executing a continuation game depending on a result of the common game with an appearance probability of the specific symbol higher than the common game, and, the CPU determines whether the game result of the continuation game establishes the awardable form of the specific symbol and the WILD symbol, fetches the fixed payout amount and the multiplication factor-related data from the memory when it is determined that the game result of the continuation game establishes the awardable form, and pay outs a payout amount calculated from the fixed payout amount multiplied by the multiplication factor.

The gaming machine of the present invention changes the gaming mode during the play of the game so as to refresh the player. Since the modified or newly added gaming mode are based on the normal mode game, the mode chance neither break the progress of the game nor degrade play's immersion into the main game, so that the continuity of the game is maintained. Since the probability that specific winning combinations are continually increased in the modified mode, the entertainingness and amusement of the game is enhanced, the player's sense of achievements can be encouraged.

BRIEF DESCRIPTION OF THE DRAWINGS

The above and other objects, features and advantages of the present invention will become more apparent by describing in detail preferred embodiments thereof with reference to the attached drawings in which:

FIG. 6 illustrates an example of a symbol code table specifying symbols on the peripheral surfaces of the reel units;

FIG. 11 illustrates a field structure of the symbol code determination table in which multiple tables are integrated into a single one;

FIG. 13 illustrates an example of payout tables;

FIG. 14 is a table exemplarily showing the increase of the probabilities of winning combinations associated with specific symbols as the chance mode games continue;

FIG. 22 illustrates another example of the symbol code table suitable for a second embodiment of the present invention in which a 'WILD' symbol is adopted;

FIG. 23 illustrates an example of payout tables suitable for the second embodiment of the present invention;

FIG. 25 summarizes multiplication factors provided by the 'WILD' symbol to be multiplied to the payout amount in the second embodiment of the present invention;

FIG. 26 illustrates an example of the multiplication of the payout amount owing to the 'WILD' symbol;

FIG. 27 exemplarily shows the increase of the probabilities of winning combinations associated with the 'WILD' symbol as the chance mode games continue;

FIG. 28 shows an example that the probability of the 'WILD' symbol appearance decreases as the games continue.

DESCRIPTION OF THE PREFERRED EMBODIMENTS

First Embodiment of Gaming Machine

Overall Configuration

Figure 1:
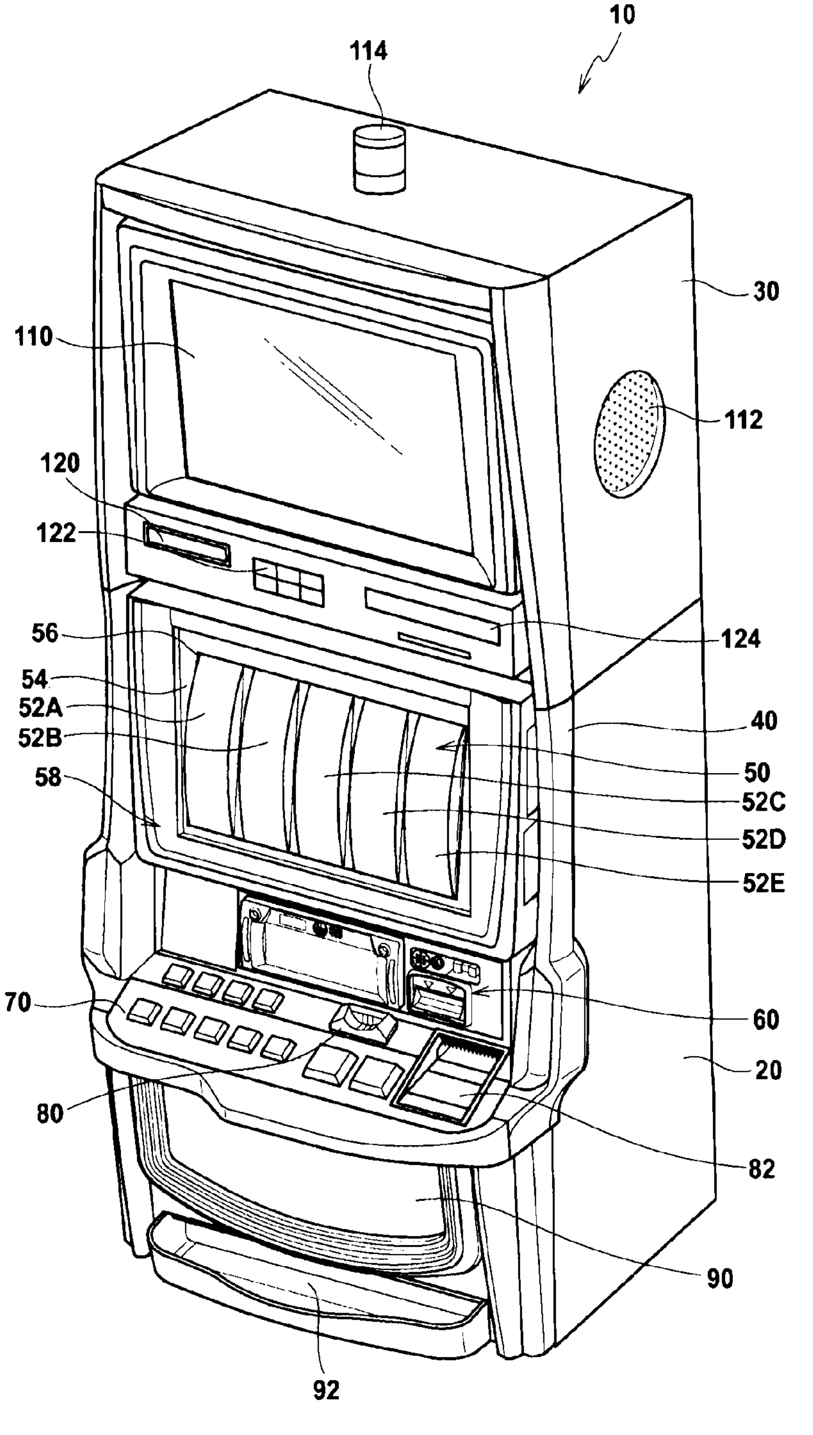
FIG. 1 is a perspective view of a gaming machine according to a first embodiment of the present invention.

FIG. 1 illustrates overall configuration of a slot machine according to a first embodiment of the present invention.

Gaming medium that can be used in the gaming machine 10 includes a coin, a bill, or electrically valuable information corresponding to these. Also, credits stored in barcode imprinted tickets or IC cards can be used for the game for the medium in the slot machine 10. It should be noted that the gaming media exemplified above are not limitative and the other kinds of media can be used as well.

The slot machine 10 shown in FIG. 1 is equipped with a cabinet 20, a top box 30 installed on the cabinet 20, and a main door 30 installed in front of the cabinet 20.

A symbol display unit 40 including a reel assembly 50 is provided at the main door 30. In the present embodiment, the reel assembly 50 includes five reels 52A-52E. Each of the reels 52A-52E has a drum which peripheral face bears plural types of symbols. The symbol display unit 40 further includes a reel cover 54 installed in front of the reel assembly 50 and having a window 56, which makes some portion of the reels 52A-52E visibly exposed to outside. The reel cover 54 is provided with a display panel 58, which preferably is implemented using a transparent liquid crystal panel. Additionally, the symbol display unit 40 may include a touch panel for receiving touch input instruction of a game player.

In a state that the reels 52A-52E are stopped, three symbols in each of the reels 52A-52E are exposed through the window 56. Thus, the symbol arrangement of five columns and three rows are formed through the window 56. One or more lines are set in advance as pay lines for determining whether an awardable form is established. Each time the game is performed, the symbol-bearing reels 52A-52E spins in different speeds and then stops to rearrange the symbols exposed through the window 56. The arrangement of the symbols determines a game result, and a benefit is awarded depending on the game result. For example, when a winning combination is established along one of the pay lines among the rearranged symbols, a payout of predetermined amount is provided to the player. Also, the arrangement of the symbols determines a gaming mode of a subsequent game from two modes: a normal mode and a chance mode, which is described below in detail.

The display panel 58 on the reel cover 54 displays a betting amount, a credit amount and a payout amount in respective areas which do not overlap the symbol arrangement. The credit amount indicates the number of coins that are owned by the player and deposited inside the slot machine 10. The payout amount indicates the number of coins to be paid out to the player when a winning combination is established.

Though the slot machine 10 employs the mechanical reels 52A-52E in the present embodiment, video reels or a combination of the mechanical reels and the video reels might be used as well, alternatively.

An IC card reader 60 is disposed below the symbol display unit 40. The IC card reader 60 receives an IC card which stores predetermined data such as player identification information and game log data related with the games previously played by the player. Also, the IC card may store data equivalent to coins, bills, or credits owned by the player. The IC card reader 60 reads and writes data from and to the inserted IC card. It is preferable that the IC card reader 60 includes an LCD display unit for displaying the data read from the IC card.

Figure 2:
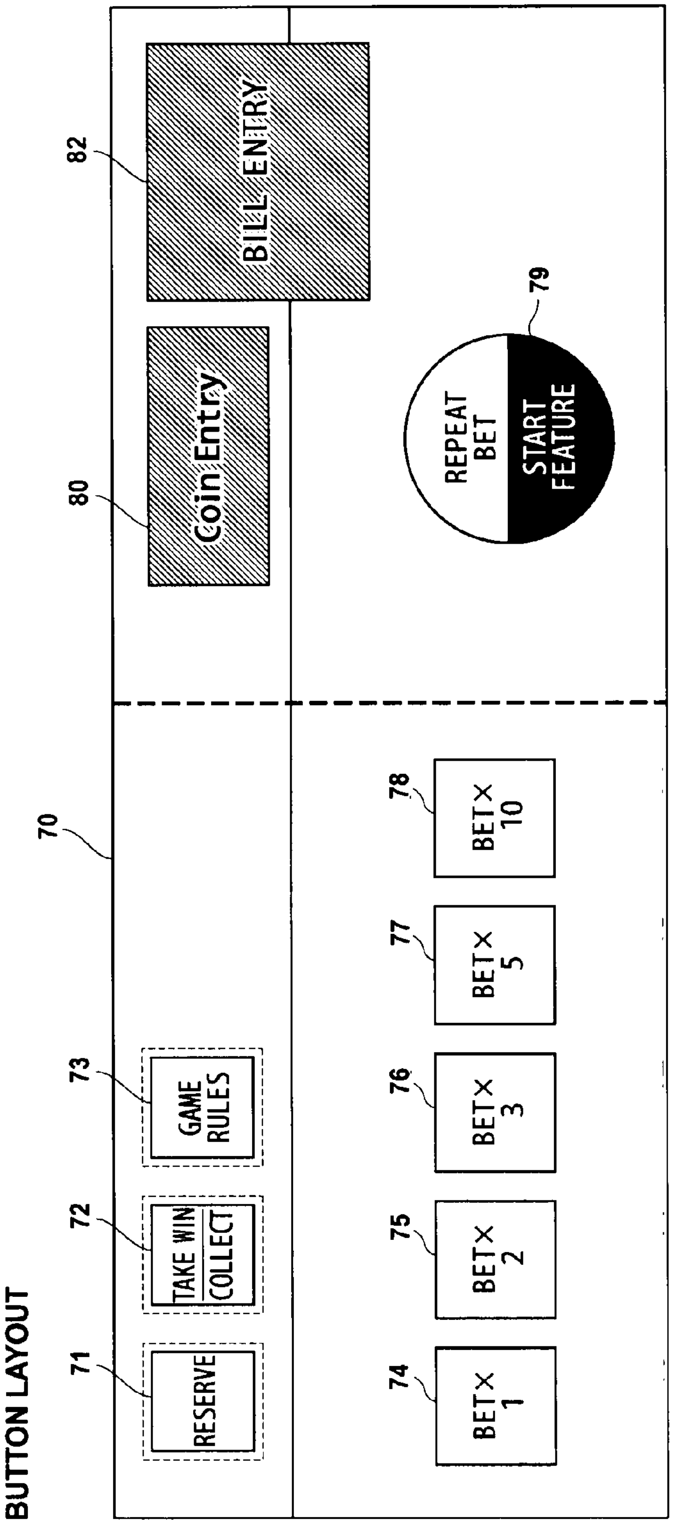
FIG. 2 illustrates a button layout in a control panel of the gaming machine shown in FIG. 1.

In front of a lower end of the IC card reader 60 are provided a control panel 70, on which includes various buttons, a coin entry 40, and a bill entry 41. Specifically, as shown in FIG. 2, a RESERVE button 71, a COLLECT button 72, and a GAME RULES button 73 are disposed on an upper left area of the control panel 70. 1-BET button 74, 2-BET button 75, 3-BET button 76, 5-BET button 77, and 10-BET button 78 are disposed on a lower left area of the control panel 70. Also, a START button 79 is disposed on the lower center area of the control panel 70. The coin entry 80 is disposed upper center area, and the bill entry 82 is disposed right area of the control panel 70.

The RESERVE button 71 is used when the player temporarily leaves the seat or when the player wants to ask a staff of the game facility to exchange money. Alternatively, the RESERVE button 71 may be used to store remaining credits into an IC card inserted into the IC card reader 60. The COLLECT button 72 is used to instruct the slot machine 10 to pay out credited coins to a coin tray 92. The GAME RULES button 73 is used when the player is not acquainted with game rules or manipulation method. When the GAME RULES button 33 is pressed, various types of help information is displayed on a video display unit 110.

The BET buttons 74-78 are used to set the betting amount. Each time the 1-BET button 74 is pressed, one credit is bet for each active pay line from the current credits owned by the player. When the 2-BET button 75 is pressed, the game is started on condition that two credits are bet for each active pay line. When the 3-BET button 76 is pressed, the game is started on condition that three credits are bet for each active pay line. When the 5-BET button 77 is pressed, the game is started on condition that five credits are bet for each active pay line. When the 10-BET button 78 is pressed, the game is started on condition that ten credits are bet for each active pay line. The START button 79 is used to instruct the initiation of spinning the reels 52A-52E under the previously set betting condition.

The coin entry 80 receives coins and guides the inserted coins into a hopper inside the cabinet 20. The bill entry 82 receives a bill and validates the legitimacy of the inserted bill to accept only a legitimate bill into the cabinet 20.

On a lower front face of the main door 13 and below the control panel 30, there are provided a belly glass 90 on which a character of the slot machine 10 or the like is drawn, and a coin tray 92 receiving coins paid out from the cabinet 20.

Referring back to FIG. 1, a video display unit 110 having a liquid crystal panel is provided at the front face of the top box 30. The video display unit 110 provides video effect for enhancing the amusement of the game, and displays information of game rules and manipulation methods. Also, a speaker 112 and a lamp 114 are provided on the side and top faces, respectively, of the top box 30. The slot machine 10 augments the amusement of the game by providing sound effect or flashing light through the speaker 112 or the lamp 114, respectively.

Below the video display unit 131, there are provided a ticket printer 120, a keypad 122, and a data display 124.

The ticket printer 120 prints, on a ticket, a bar code containing the credit data, date and time, and an ID number of the slot machine 10 to output the barcode imprinted ticket. The player can exchange the barcode imprinted ticket with bills or the like at a predetermined location of a gaming facility (e.g., from a casher in a casino).

The keypad 122 includes a plurality of keys allowing the player to input instructions pertinent to the issuance of the ticket. The data display 124, which is implemented using a fluorescent display, LEDs, or the like, displays data input by the player through the keypad 122.

Electrical Configuration of Slot Machine

Figure 3:
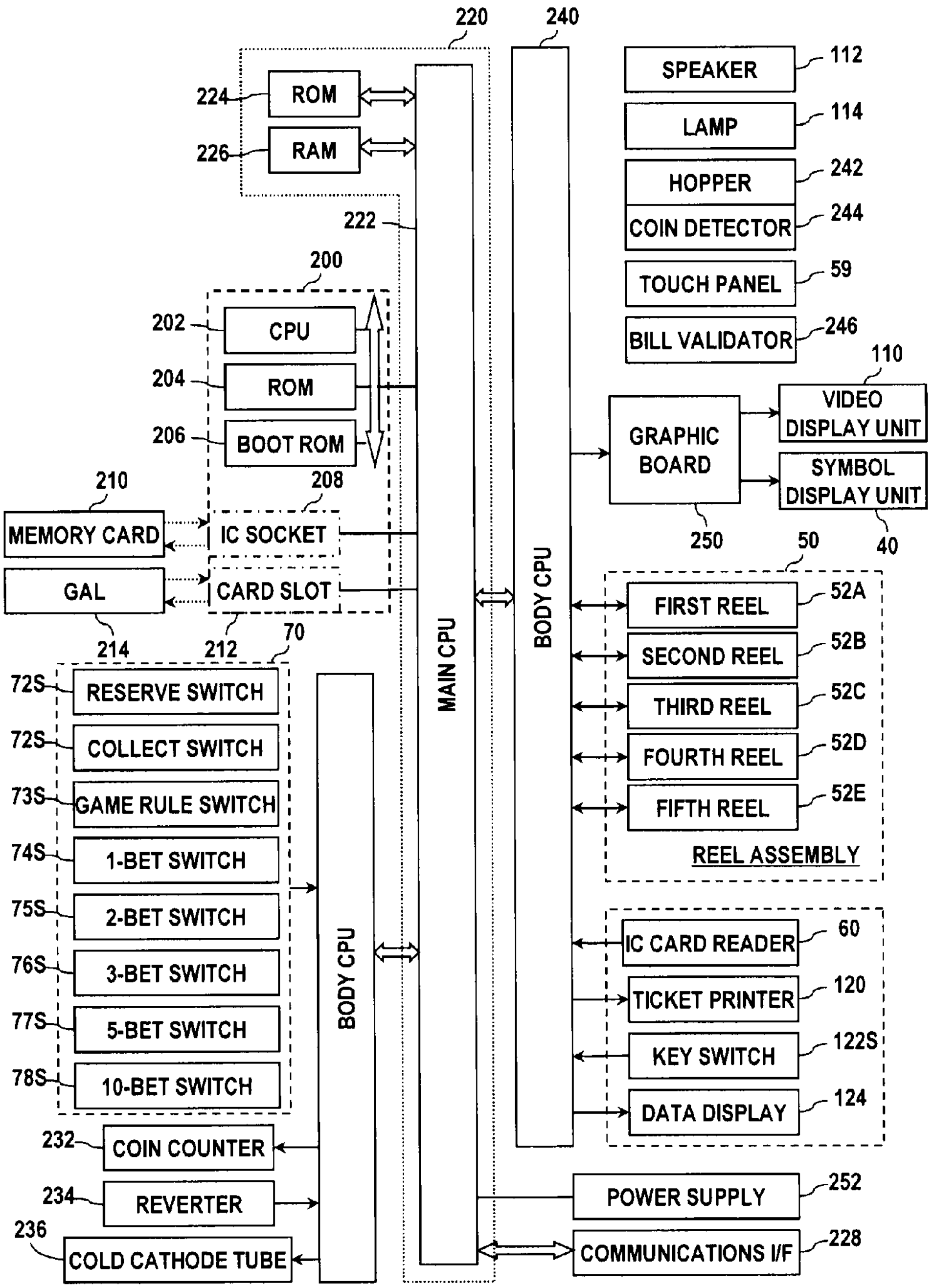
FIG. 3 is an electrical block diagram of the gaming machine of FIG. 1.

FIG. 3 is an electrical block diagram of the slot machine 10 shown in FIG. 1. The slot machine 10 includes a gaming board 200, a motherboard 220, and a door PCB 230, and a body PCB 240.

A gaming board 200 includes a CPU 202, a ROM 204 accessible by the CPU 202 through an internal bus, and a boot ROM 206 accessible by the CPU 202 by an internal bus. The gaming board 200 additionally includes a card slot 208 which can receive and communicate with a memory card 210, and an IC socket 212 provided correspondingly to a Generic Array Logic (GAL) 214.

The memory card 210 includes a non-volatile memory and stores a game program and a game system program.

The card slot 208 is configured to receive and eject the memory card 210, and is connected to a motherboard 220 by an IDE bus. The details of the game performed in the slot machine 10 can be changed by replacing the memory card 210 with another one, or by withdrawing the memory card 210 from card slot 208, writing another program into the memory card 210, and then inserting the memory card 210 into the card slot 208 again.

The GAL 214, which is a type of a Programmable Logic Device (PLD) having a fixed OR array structure, has a plurality of input ports and output ports. When the GAL 214 receives certain data through the input ports, it outputs data corresponding to the input data through the output ports.

The IC socket 212 is configured in such a manner that the GAL 214 can be inserted into the IC socket 212 or detached from the IC socket 212, and connected to a motherboard 220 by a PCI bus.

The CPU 202, the ROM 204, and the boot ROM 206 interconnected by the internal bus are connected to the motherboard 220 by the PCI bus. The PCI bus enables signal transmission between the motherboard 220 and the gaming board 200, and supply of power from the motherboard 220 to the gaming board 200.

The ROM 204 stores an authentication program. The boot ROM 206 stores a preliminary authentication program, a boot code to be used by the CPU 202 for activating the preliminary authentication program, and the like. The authentication program is a tamper check program for authenticating the originality of the game program and the game system program. The preliminary authentication program is a program for authenticating the originality of the authentication program. The authentication program and the preliminary authentication program are written in a sequence of proving that the subject program has not been tampered.

The motherboard 220, which can is implemented using a commonly available general main board, executes the game program and the game system program. The motherboard 220 includes a main CPU 222, a ROM 224, a RAM 226, and a communication interface 228.

The ROM 224, which may be a flash memory, is a memory device for storing a program to be executed by the main CPU 222 such as BIOS, along with another data to be maintained permanently. When being executed by the main CPU 222, the BIOS performs initialization of peripheral devices. Also, the BIOS starts to load the game program and the game system program stored in the memory card 54 through the gaming board 200. The ROM 224 may be rewritable. However, write-protected one might be used as the ROM 224 as well.

The RAM 224 stores data and programs which are used during the operation of the main CPU 222. For example, when the game program, the game system program, or the authentication program is to be loaded, the RAM 224 can store such programs. Also, the RAM 224 is provided with working space for the execution of the programs. Examples of the space include a space for storing the number of bets, the payout amount, the credit amount, and the like can be maintained during the execution of the game. Also, plurality of tables defining symbols, symbol codes, winning combinations, and their probabilities are maintained during the execution of the game. Further, the RAM 224 stores symbol code determination tables which stores mapping information between symbol codes and random number which can used for determining symbols based on random numbers. In particular, the RAM 224 maintains a mode flag indicating the gaming mode, along with a game and a game counter of which count value indicates the number of executed chance mode games or the number of possibly remaining chance mode games.

Also, the RAM 224 stores count values of a plurality of counters, which include a bet counter, a payout amount counter, a credit amount counter, and a chance mode game counter which counts the number of chance mode games. Alternatively, however, some of the count values can be maintained in an internal register of the main CPU 222.

The communication interface 224 facilitates data communication of the main CPU 222 with an external controller of, for example, a server through a communication channel.

Besides, the motherboard 220 is connected to a door PCB 230 and a body PCB 240 by USB communications. The motherboard 220 is also connected to a power supply 252. The main CPU 222 of the motherboard 220 boots up and operates using the power supplied from the power supply 252, and passes over some of the power to the gaming board 200 through the PCI bus so as to boot up the CPU 202. The door PCB 230 and the body PCB 240 are connected to input devices such as a switch and a sensor, and peripheral devices of which operation are controlled by the main CPU 222. Also, the door PCB 230 is connected with a control panel 70, a coin counter 232, a reverter 234, and a cold cathode tube 236.

The control panel 30 has a reserve switch 71S, a collect switch 72S, a game rule switch 73S, a 1-BET switch 74S, a 2-BET switch 75S, a 3-BET switch 76S, a 5-BET switch 77S, a 10-BET switch 78S, and a start switch 79S, each of which is provided correspondingly to respective buttons 71-79. Each of the switches 71S-79S detects pressing of the respective button 71-79 to output a signal to the main CPU 222.

The coin counter 232 and the reverter 234 are installed in the coin entry 80. The coin counter 232 validates legitimacy of coins inserted into coin entry 80 in terms of material, shape, or the like. The coin counter 232 outputs a signal to the main CPU 222 when detecting a legitimate coin. Meanwhile, illegitimate coins are discharged to the coin tray 90. The reverter 234, which operates based upon a control signal from the main CPU 222, distributes the legitimate coins validated by the coin counter 232 into either a hopper 242 or a cash box (not shown in the drawing). The coins are guided into the hopper 242 when the hopper 242 is not filled with coins. Contrarily, however, the coins are guided into the cash box when the hopper 242 is filled with coins.

The cold cathode tube 236, which is installed on the rear face of the video display unit 110, functions as a backlight and illuminates based on a control signal from the main CPU 222.

The body PCB 240 is connected with the speaker 112, the lamp 114, the hopper 242, a coin detector 244, the touch panel 59, a bill validator 246, the reel assembly 50, the IC card reader 60, a graphic board 250, the ticket printer 120, a key switch 122S, and the data display 124.

The lamp 114 flashes based upon a control signal from the main CPU 222. The speaker 112 outputs a sound such as BGM based upon the control signal from the main CPU 222.

The hopper 242, which operates based upon a control signal from the main CPU 222, pays out coins of the designated payout amount to the coin tray 92 through a coin payout exit formed between the belly glass 90 and the coin tray 92. The coin detector 244 detects coins paid out from the hopper 242 to output a detection signal to the main CPU 222.

The touch panel 59 detects a position touched by the player to provide the main CPU 222 with a position sense signal corresponding to the detected position. The bill validator 246 in the bill entry 82 provides, upon detection of a legitimate bill, the main CPU 222 with a bill detection signal corresponding to the bill amount.

The graphic board 250 controls video display of the video display unit 110 and the display panel 58 of the symbol display unit 40 in response to a control signal from the main CPU 222. The graphic board 250 includes a Video Display Processor (VDP) generating video data, and a video RAM temporarily storing the video data. The video data may be originated from the game program stored in the RAM 224.

The IC card reader 60 reads out data stored in the IC card inserted into the card slot 176 to provide the read-out data to the main CPU 222. Also, the IC card reader 60 writes data received the main CPU 222 into the ID card.

The ticket printer 120 prints on a ticket the barcode containing information of the credit amount stored in the RAM 224, date and time, the identification number of the slot machine 10, and the like, in response to the control signal from the main CPU 222 to output the barcode imprinted ticket.

The key switch 122S, which is installed behind the keypad 122, outputs a key detection signal to the main CPU 222 when the keypad 122 is pressed by the player.

The data display 124 displays information related the input through the keypad 122 in response to a control signal from the main CPU 222.

Figure 4:
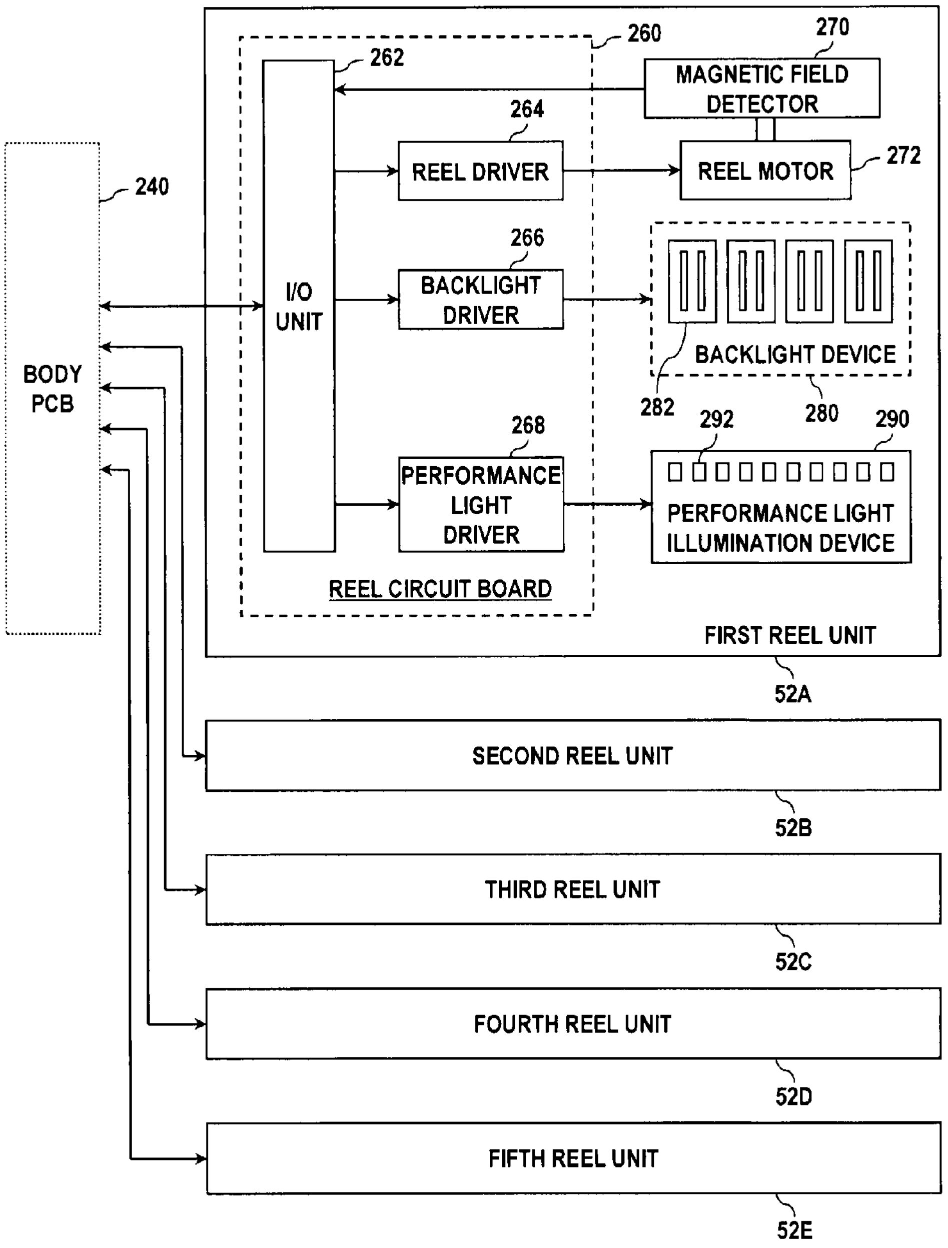
FIG. 4 is a block diagram of an electrical circuit in the reel assembly.

The body PCB 240 is also electrically connected to the reel assembly 50, which includes the first thorough the fifth reel units 52A-52E as mentioned above. FIG. 4 is a block diagram of an electrical circuit in the reel assembly 50. Each of the reel units 52A-52E is equipped with a reel circuit board 260. The reel circuit board 260 includes an input/output (I/O) unit 262 capable of communicating with the body PCB 240, a reel driver 264 connected to the I/O unit 262, a backlight driver 266, and an illumination driver 268.

To the I/O unit 262 is connected a magnetic field detector 270, which includes a magnetic sensor for sensing magnetic field intensity to output a magnetic detection signal proportional to the magnetic field intensity, and sensor fixation means for fixing the magnetic sensor to a predetermined position. The magnetic sensor detects the intensity of the magnetic field generated by a magnet which is connected to a rotating axis of a reel motor 272 to rotate with the reel 52A.

The reel driver 264 supplies electric power to the reel motor 272. The backlight driver 266 supplies electric power individually to each light source 282 in a backlight device 280. The illumination driver 268 supplies electric power individually to each light source 292 of a performance light illumination device 290.

Since the second thorough the fifth reel units 52B-52E have the same configuration as the first reel unit 52A, detailed description thereof will be omitted.

Figure 5:
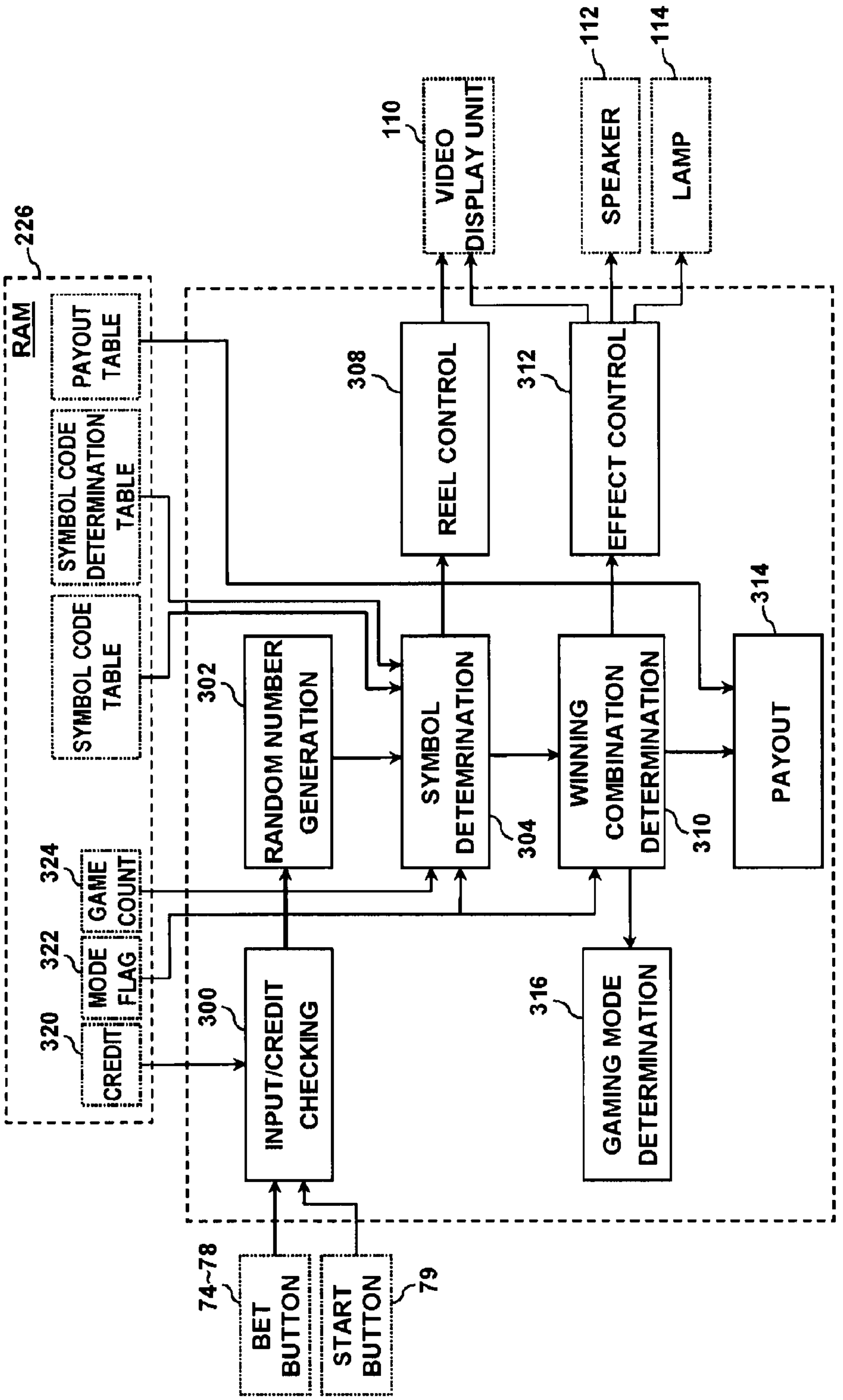
FIG. 5 is a functional block diagram of a game program executed by a main CPU shown in FIG. 3.

FIG. 5 is a functional block diagram of the game program executed in the main CPU 222 of the motherboard 220. When the power is supplied to the slot machine 10, the main CPU 222 reads the authenticated game program and game system program from to the memory card 210 through the gaming board 200 and writes the programs into the RAM 226. The game program is executed in a state being loaded into the RAM 226 in such a manner.

According to the preferred embodiment, the game program includes a input/bet checking function 300, a random number generating function 302, a symbol determination function 304, a game counter 306, a reel control function 308, a winning determination function 310, a production effect control function 312, a payout function 314, and a gaming mode determination function 316 to execute respective processing.

The bet/input checking function 300, in an idle state where the reels 52A-52E are stopped, continuously checks whether any of the BET buttons 74-78 or the START button 79 is pressed. After the BET buttons 74-78 or the START button 79 is pressed, the bet/input checking function 300 checks whether there remains any credit for the player on the basis of the credit data 320 stored in the RAM 226. If the player has at least one remaining credit, the bet/input checking function 300 call the random number generating function 302.

Subsequently, the random number generating function 302 generates random numbers to be used for the symbol determination 304. In the present embodiment, the random number generating function 302 generates five random numbers, each of which is directed to respective one of the first though the fifth reel units 52A-52E.

After five random numbers are completely extracted, the symbol determination function 304 determines a to-be-stopped symbol for each of the reel units 52A-52E with reference to the symbol code determination table stored in the RAM 226. The symbol determination function 304 uses the five random numbers to determine five to-be-stopped symbols for the reel units 52A-52E to be exposed in window 56 of the symbol display unit 50 for each of the reel units 52A-52E.

In particular, the symbol determination function 304 checks the current gaming mode with reference to the mode flag 322 stored in the RAM 226, and differentiates the symbol determination process between the normal mode and the chance mode. In the normal mode, the symbol determination function 304 applies a fixed symbol code determination table to determine the symbol using the random number according to a fixed scheme. Contrarily, however, the symbol determination function 304 consecutively changes the symbol code determination table for each unit game to vary the symbol determination process. The consequence of varying the symbol code determination table is that winning combinations including at least one specific symbol increases as the chance mode games continue. Possible number of chance mode games available in a single session is limited to a certain limit, e.g., eight. In order to limit the number of chance mode games, a game counter 306 counts the number of chance mode games already performed or possibly remaining in the session, and the game count value 324 is stored in the RAM 226. The game counter 306 may reside in the symbol determination function 304, alternatively.

The reel control function 308 provides controls the reel assembly 50 by providing stop position information corresponding to the determined symbols, so that the reels 52A-52E spins and stops at position designated by the stop position information. Thus, the symbols scrolls along with the spinning of the reels 52A-52E and then stops in such a manner that the determined symbols are arranged in central position vertically in the window 56 of the symbol display unit 50.

Meanwhile, the winning determination function 310 determines whether any wining combination is established in the rearranged symbols. In case that a winning combination is established in the rearranged symbols, the production effect control function 312 controls the symbol display unit 40 and the other devices such as the speaker 112, the lamp 114, the video display unit 110 to output production effect. The production effect includes video and audio effect, backlight change, and lighting effect. Also, the payout function 314 determines payout amount depending on the established winning combination to payout the amount the player obtained.

Meanwhile, whenever the unit game is completed, the gaming mode determination function 316 determines the gaming mode of the next unit game. The gaming mode determination function 316 changes the normal mode into the chance mode when a trigger event occurs in the rearranged symbols. On the other hands, the gaming mode determination function 316 changes the chance mode into the normal mode when an exit condition is satisfied. In the other cases, the gaming mode determination function 316 maintains the previous gaming mode. Meanwhile, the gaming mode determination function 316 can be implemented inside winning determination function 310.

Symbols, Winning Combinations, and Pay Lines

FIG. 6 illustrates an example of a symbol code table specifying symbols on the peripheral surfaces of the reels 52A-52E.

The symbols marked on each of the reels 52A-52E form a symbol column consisting of eleven symbols. Hereinbelow, the series of symbols marked on the reels 52A-52E are referred to as first through fifth symbol columns, respectively. In the present exemplary embodiment, the symbol columns include six types of symbols: 'SEVEN', 'BAR', 'DOUBLE BAR', 'TRIPLE BAR', 'CHERRY', and 'CHANCE CHERRY' symbols. In each of the symbol columns, each symbol is assigned a code ranging from "00" to "10." For example, the first symbol, 'BAR', in the first symbol column is assigned a code of "01." The second symbol, 'SEVEN', in the first symbol column is assigned a code of "00." The eighth symbol, 'SEVEN', in the first symbol column is assigned a code of "07."

Three consecutive symbols in each symbol column can be exposed through the window 56 of the symbol display unit 40 to arrange a symbol matrix having three rows and five columns. Each time the BET buttons 74-78 or the START button 79 is pressed, the symbol-bearing reels 52A-52E starts to spin so that the symbols exposed through the window 56 scrolls vertically. After a certain time period elapses, the scroll of the symbols stops to rearrange the symbol matrix.

Figure 7:
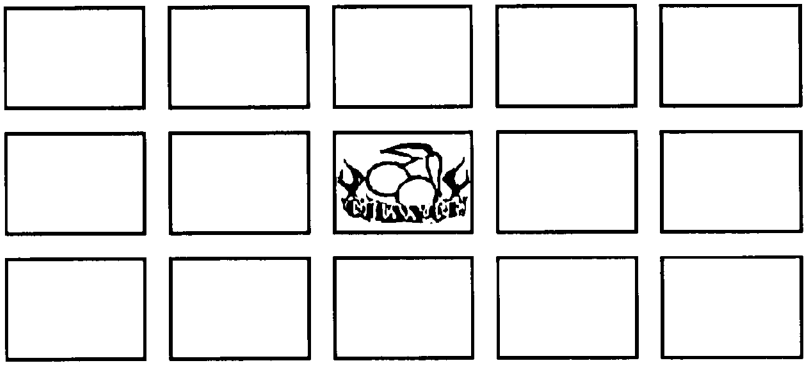
FIG. 7 illustrates a trigger condition that a trigger symbol is located in a predetermined position.

The 'CHANCE CHERRY' symbol appearing only in the third symbol column works as a trigger symbol which triggers the entry of the gaming mode into the chance mode. In the present embodiment, the 'CHANCE CHERRY' symbol generally has a shape similar to the common 'CHERRY' symbol, but is integrated with a background image of flaming fire surrounding the cherry image. The chance mode is initiated after the 'CHANCE CHERRY' symbol appears in the position of the second row and third column as shown in FIG. 7. The condition for returning of the gaming mode into the normal mode will be described below.

Meanwhile, plural kinds of winning combination of symbols (referred to as "winning combinations" hereinbelow) for awarding benefits to the player is defined in advance. The benefits include the payout of a predetermined amount by increasing of credits or discharging of coins.

Figure 8:
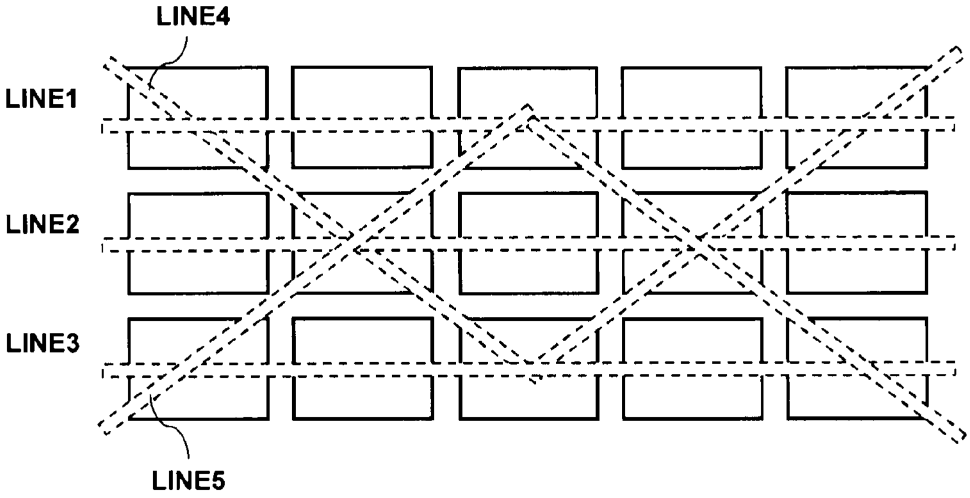
FIG. 8 illustrates pay lines set in a preferred embodiment of the present invention.

FIG. 8 illustrates pay lines set in a preferred embodiment of the present invention. In the present embodiment, five pay lines are set in the symbol matrix. A first through a third pay lines extend horizontally to cover the symbols in the first through the third rows, respectively, in the symbol matrix. A fourth pay line extends in a 'V'-shaped path to pass the symbol in the first row and the first column, one in the second row and the second column, one in the third row and the third column, one in the second row and the fourth column, and one in the first row and the fifth column. A fifth pay line extends in a 'reversed V'-shaped path to pass the symbol in the third row and the first column, one in the second row and the second column, one in the first row and the third column, one in the second row and the fourth column, and one in the third row and the fifth column.

Each of the pay lines can be partially activated depending on the player's choice. Alternatively, however, all the five pay lines can be effective or activated irrespectively of the betting amount or the player's choice. Also, it is noted that the total number of pay lines can vary depending on the size of the symbol matrix, and another pay lines may be set arbitrarily by the manufacturer.

Gaming Modes: Normal Mode and Chance Mode

The slot machine 10 selectively performs the games in two modes: normal mode and chance mode. Gaming sequence in the chance mode is generally similar to that in the normal mode. However, the payouts for at least some of the winning combinations in the chance mode are different from those in the normal mode. Also, producing effects such as video effect and sound effect can differ between the two gaming modes.

Figure 9:
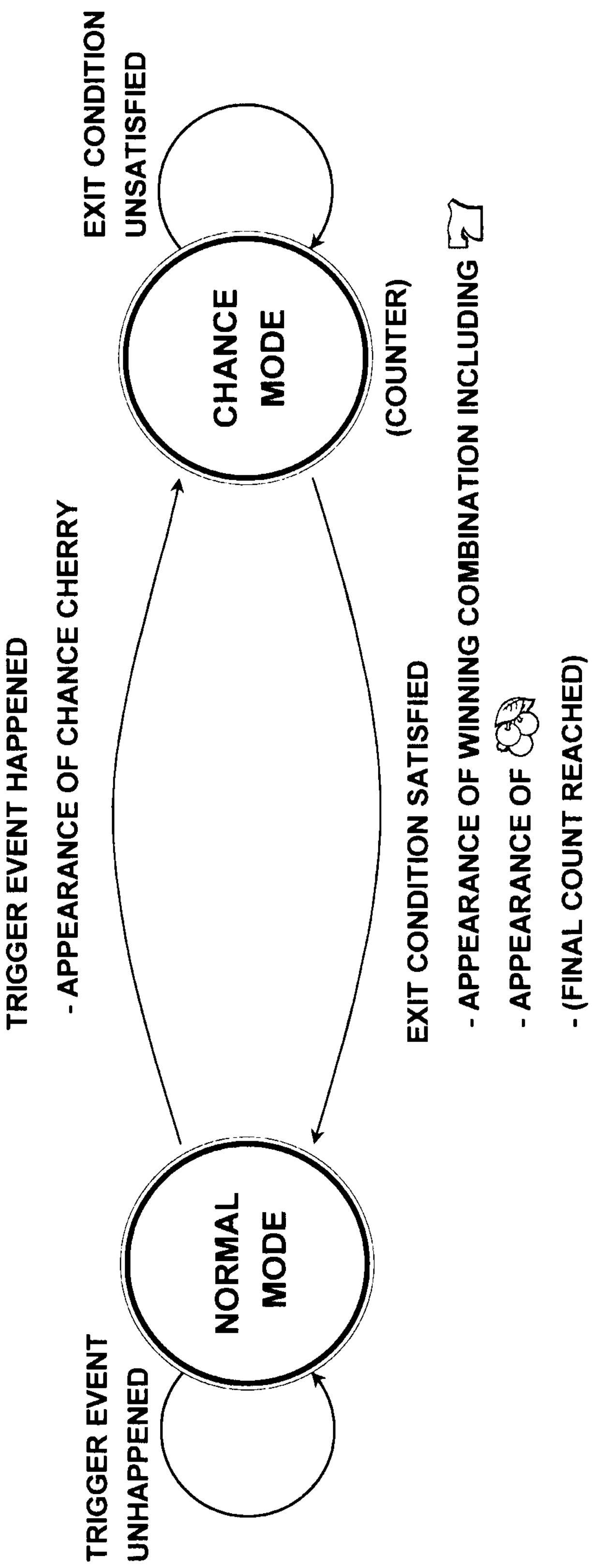
FIG. 9 is a state transition diagram of the slot machine of FIG. 1.

FIG. 9 is a state transition diagram of the slot machine 10.

Usually, the slot machine 10 is in a state of the normal mode, and maintains the normal mode state unless a trigger event happens. When the trigger event happens during the normal mode, a state transition occurs to shift to the chance mode. In a preferred embodiment, the trigger event is the appearance of the 'CHANCE CHERRY' symbol in the second row and third column of the symbol matrix.

Once the slot machine 10 enters the chance mode, this state is maintained unless an exit condition is satisfied. In an exemplary embodiment, one exit condition is the appearance of one of winning combinations comprised of the 'SEVEN' symbol. Another exit condition is the appearance of the 'CHERRY' symbol in the symbol matrix. Meanwhile, just after the entry into the chance mode, the slot machine 10 sets a game counter to counts up or down each time the chance mode game is carried out. A maximum number of games in the chance mode is eight in a single chance mode session. Here, the terminology "chance mode session" denotes a period from the entry to the exit of the chance mode. Thus, if the upcounted value reaches eight or the downcounted value reaches zero, the slot machine 10 ensures the appearance of the 'CHERRY' symbol or one of the winning combinations comprised of the 'SEVEN' symbol, so that the exit condition is satisfied. Such an operation can be performed by, for example, repetitively determining new symbol combination until the symbol arrangement establishing the exit condition is acquired. When the exit condition is satisfied, the gaming state returns to the normal mode state to resume the normal mode games.

Symbol Code Determination Tables and Payout Tables

Regardless of the gaming modes, the arrangement of symbols is carried out on the basis of several tables stored in the RAM 224 of the motherboard 220. As mentioned above, the RAM 224 stores at least one of the symbol code determination table and/or the symbol determination table. The RAM 224 further stores a plurality of payout tables.

Figure 10:
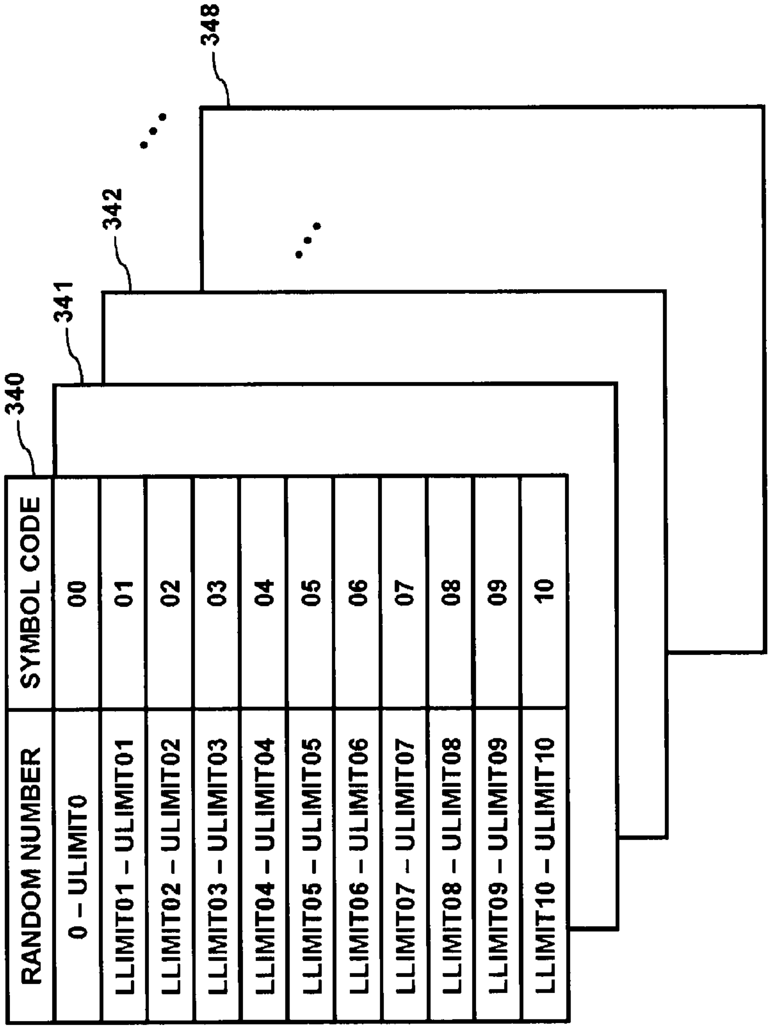
FIG. 10 illustrates an example of field structure of a symbol code determination table.

FIG. 10 illustrates an example of field structure of the symbol code determination table.

The symbol code determination tables 340-348 stores mapping relationships between the random numbers generated by the random number generation function 302 and the symbol codes, each of which denotes a symbol as shown in FIG. 6. Thus, each time a random number is generated by the random number generation function 302, the symbol determination function 304 determines one symbol code and associated symbol with reference to the symbol code determination tables 340-348. The wider a random number range is, the higher the probability that the associated symbol is determined is. Also, as the total range of the random numbers increases, the probability of each symbol code can be controlled more precisely.

Among the symbol code determination tables 340-348, the table 340 is dedicated for determination of symbols in the normal mode, and the tables 341-348 are provided for determining symbols in the first through the eighth chance mode games, respectively.

In the case that the symbol columns are different from one another, each of the symbol code determination tables 340-348 may be further segmented into five tables each for respective symbol column. Additionally, all the tables can be integrated into a single table having forty five data fields as shown in FIG. 11. Depending on the gaming modes and symbol columns, the symbol determination function 304 can choose and utilize one field among the forty five fields. However, it is noted that each of the forty five fields are regarded as a separate table in this specification including the appended claims.

Meanwhile, in the case that two or more symbol columns are the same as each other, the determination of symbols in such columns can be carried out using a common symbol code determination table. For example, in the example of FIG. 6, the second symbol column has the same symbol sequence as the fourth symbol column, and thus the symbol code determination table for the second column can be used for the symbol determination in the fourth column. Similarly, since the first second symbol column has the same symbol sequence as the fifth symbol column, and symbol code determination table for the first column can be used for the symbol determination in the fifth column.

Once the symbol determination function 304 determines five symbols in a row (e.g., the second row) in the symbol matrix and resultant all the symbol matrix, the winning determination function 310 determines whether any of the winning combinations is established, and the gaming mode determination function 316 determines the gaming mode of a subsequent game.

Figure 12:
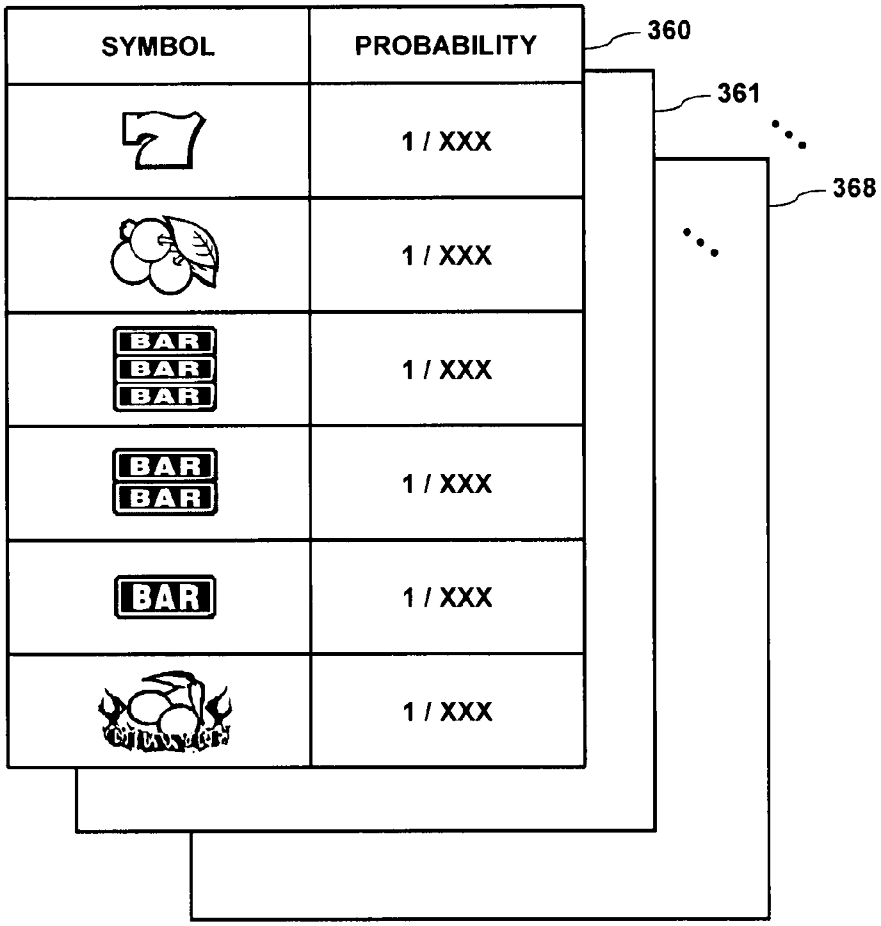
FIG. 12 illustrates an example of symbol determination tables.

FIG. 12 illustrates an example of the symbol determination table. The symbol determination tables 360-368 designate the probabilities that each symbol appears in the pay lines. The symbol code determination tables 340-348 shown in FIG. 10 may be prepared based on the symbol determination tables 360-368, respectively. Among the symbol determination tables 360-368, the table 360 is dedicated for the normal mode, and the tables 361-368 are provided for the first through the eighth chance mode games, respectively.

Similarly to the symbol code determination tables 340-348, each of the symbol determination tables 360-368 may be further segmented into five tables each for respective symbol column. Additionally, all the tables can be integrated into a single table having forty five data fields as well.

The probability that each symbol appears in pay lines influences on the probabilities that the winning combinations are established. Conversely, the symbol determination tables 360-368 can be generated based on the probabilities of the winning combinations. The winning combinations and respective probabilities are summarized as payout tables 380-388 shown in FIG. 13. The payout tables 380-388 define the winning combinations for awarding the benefit along with their respective payouts. The payout tables 380-388 are prepared separately for the normal mode games and the chance mode games. In particular, it is preferable that the payout tables for use in the eight games in the chance mode are prepared separately. Among the payout tables 380-389, the table 380 is dedicated for the normal mode games, and the tables 381-388 are applicable for the first through the eighth chance mode games, respectively. All the payout tables 380-388 might be integrated into a single table as well.

Each time the game is performed, the winning determination function 310 included in the game program and executed by the main CPU 222 determines whether any winning combination is established in the pay lines. In case that a winning combination defined in the payout tables 380-388 is included in one of the pay lines, the winning determination function 310 detects the winning combination and checks the payout amount with reference to payout tables 380-388, so that the payout function 314 pays out the determined amount. If, however, the symbols displayed on the pay line do not establish any winning combination, it is determined to be so-called "losing."

For example, in case where four symbols of "SEVEN" are arranged in one of the pay lines LINE1-LINE5 across the symbol columns, a winning combination of "THREE SEVEN" is established and two hundred times the betting amount is paid out. The benefit of payout can be provided by actually discharging coins to the tray 92, or adding the credits by the amount.

Probabilities of Winning in Chance Mode

As mentioned above, when the 'CHANCE CHERRY' symbol appears in the position of the second row and third column in the symbol arrangement, the gaming mode enters the chance mode and maintains the mode until the exit condition is satisfied. The exit condition is the appearance of one of the winning combinations comprised of plural 'SEVEN' symbols or the appearance of the 'CHERRY' symbol in one of the pay lines.

Upon entry into the chance mode, the counter function 306 shown in FIG. 5 is executed to set up a counter for counting the number of chance mode games already performed or to be performed. Then, the random number generation function 304 generates the random numbers, and the symbol determination function 304 determines to-be-stopped symbols using the random numbers with reference to the symbol code determination tables 341-348. The symbol determination function 304 uses the symbol code determination table 301 in the first chance mode game. As the chance mode games continues, the next symbol code determination table is used sequentially. When the chance mode lasts to the eighth game which is defined the last chance mode game in the present embodiment, the symbol determination function 304 ensures the satisfaction of the exit condition, even when the exit condition is not satisfied at once, by repetitively determining new symbol combination until the symbol arrangement establishing the exit condition is acquired.

The probabilities that the winning combinations are established according to the symbol code determination tables 301-308 are different from one another. In particular, the probabilities of establishment of some winning combination containing a certain specific symbol increase as the progress of the chance mode. In this regard, the symbol code determination tables 301-308 have such mapping data between the random numbers and the symbol codes that causes the specific symbol related combinations to be more frequently established as the progress of the chance mode.

In the present embodiment, the specific symbol is the "SEVEN" symbol. That is, the probability that the "SEVEN" symbol appears in the symbol matrix or symbol arrangement increases as the chance mode continues. Meanwhile, the probability that the specific symbol, "SEVEN" symbol, may be higher than that in the normal mode. On the other hand, another symbol such as "CHERRY" symbol can be additionally defined as the specific symbol. In the description below, it is assumed that both the "SEVEN" and "CHERRY" symbols are used as the specific symbols.

FIG. 14 shows the increase of the probabilities of winning combinations associated with the specific symbols. As can be seen in the right table in FIG. 14, the probability that the winning combination of "THREE SEVEN" combination is established increases as the chance mode games continue. In other words, the probability of the "THREE SEVEN" combination in the second game is higher than that in the first game. Also, the probability in the third game is higher than that in the second game. In such a manner, the probability of the "THREE SEVEN" combination gradually increases until the last game is reached. The similar are the other winning combination of "FOUR SEVEN" and "FIVE SEVEN."

As a result, the total probability of the winning combinations related with "SEVEN" symbol increases as the chance mode game is repetitively carried out. In the example shown in the drawing, the probabilities of the "THREE SEVEN," FOUR SEVEN," and "FIVE SEVEN" combinations are 1/32.8, 1/67.2, and 1/672.0, respectively, in the first chance mode game. Thus, the total probability of the 'SEVEN' symbol-related combinations is 1/21.7 (=1/32.8+1/67.2+1/672.0) in the first chance mode game. The total probability increases to 1/18.7 in the second game, and continues to increase to 1/3.1 in the eighth game.

Similar are the probabilities of the 'CHERRY' symbol-related winning combinations. Though the total probability of the 'CHERRY' symbol-related combinations is set to zero in the first game in order to prevent the player from feeling insipid or hollow, the probability still increases as the games go on. Specifically, the total probability of the 'CHERRY' symbol-related combinations is 1/10.4 in the second game, which increases to 1/6/6 in the third game. After continuous increase, the total probability of the 'CHERRY' symbol-related combinations reaches 1/1.5 in the eighth game.

The sum of the probabilities of the winning combinations related with the 'SEVEN' and 'CHERRY' symbols is 1/21.7 in the first game. Thus, the probability that the gaming mode exits the chance mode is about 4.61% (=1/21.7) after the first game, and there remains a probability of 95.39% (=1−1/21.7) that the chance mode continues.

In the second game, the sum of the probabilities of the winning combinations related with the 'SEVEN' and 'CHERRY' symbols increases to 1/6.7 (=1/10.4+18.7). Thus, the probability that the gaming mode exits the chance mode is about 14.95% (=95.39%×1/6.7) after the second game, and there remains a probability of 85.05% (=95.39%×(1−1/6.7)) that the chance mode continues. In the third game, the sum of the probabilities of the winning combinations related with the 'SEVEN' and 'CHERRY' symbols increases to 1/4.6 (=1/6.6+15.1). Thus, the probability that the gaming mode exits the chance mode is about 21.73% (=85.05%×1/4.6) after the third game, and there remains a probability of 78.27% (=85.05%×(1−1/4.6)) that the chance mode continues.

Finally, the sum of the probabilities of the winning combinations related with the 'SEVEN' and 'CHERRY' symbols increases to 1/1.0 (=1/1.5+3.1) in the eight game. Thus, the probability that the gaming mode exits the chance mode is 100% after the eighth game. When the eighth game is reached, the random number generation function 302 and the symbol determination function 304 repetitively generates the random numbers and determines the symbols, respectively, until the winning combination is established.

Operation of Slot Machine

Next, the operation of the slot machine 10 will be described with reference to FIGS. 15 through 20.

Figure 15:
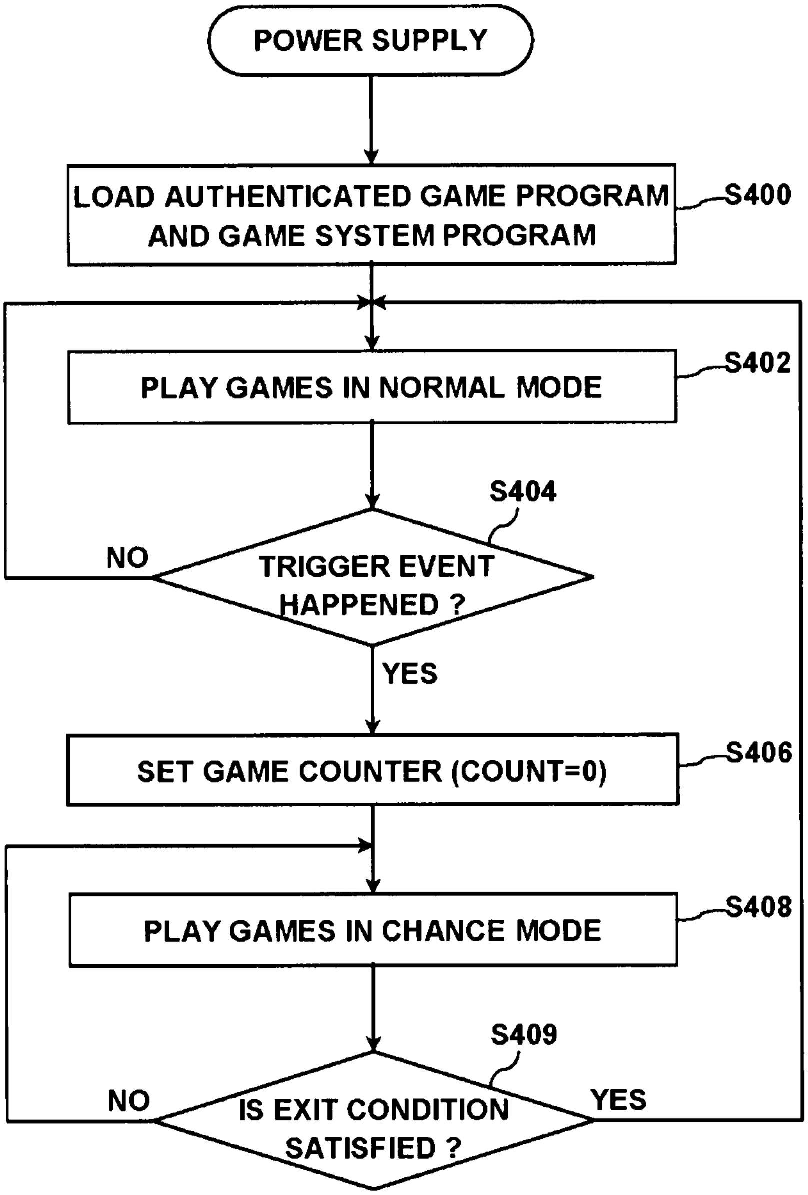
FIG. 15 is a flowchart showing a general process carried out in the slot machine of FIG. 1.

FIG. 15 generally shows the process carried out in the slot machine 10.

When the power is supplied to the slot machine 10, the main CPU 222 loads the authenticated game program and game system program by reading the programs from the memory card 210 through the gaming board 200 and writing into the RAM 226 (step 400). Subsequently, the main CPU 222 executes the game program and the game system program.

If a new player tries to start games by inserting the IC card into the IC card reader 60 or inserting coins into the coin entry 89, new games can be played based on the inserted coins or the stored bets. When the game is initially played, the gaming mode will be in the normal mode. Thus, the main CPU 222 performs the normal mode gaming process for the first game (step 402).

Whenever the normal mode game is completed, the gaming mode determination function 316 executed by the main CPU 222 determines whether the trigger event happened (step 404). Unless the trigger event is happened, the gaming mode of the subsequent game remains in the normal mode. Thus, the process returns to the step 402, and the main CPU 222 performs the normal mode gaming process for the subsequent game.

If, however, it is determined in the step 404 that trigger event happened, the gaming mode of the subsequent game is changed into the chance mode.

As mentioned above, the number of chance mode games that can be performed in a single session is limited to eight games in a preferred embodiment. On the other hand, the symbol code determination table 341-348 which can be applies to each of the chance mode game is different from one another. Whenever each chance mode game is performed, the game counter may upcount the number of chance mode games already performed or downcount the maximum remaining games. In the description below, it is assumed that the game counter upcounts the number of chance mode games already performed from zero. Thus, in step 406, the main CPU 222 sets a game counter as zero. Afterwards, the main CPU 222 performs the chance mode gaming process for the subsequent game (step 408).

Whenever the chance mode game is completed, the gaming mode determination function 316 determines whether the exit condition is satisfied (step 409). Unless the exit condition is satisfied, the gaming mode of the subsequent game remains in the chance mode. Thus, the process returns to the step 408, and the main CPU 222 performs the chance mode gaming process for the subsequent game.

If, however, it is determined in the step 409 that the exit condition is satisfied, the gaming mode of the subsequent game returns to the normal mode. Thus, the process returns to the step 402, and the main CPU 222 performs the normal mode gaming process for the subsequent game.

Figure 16:
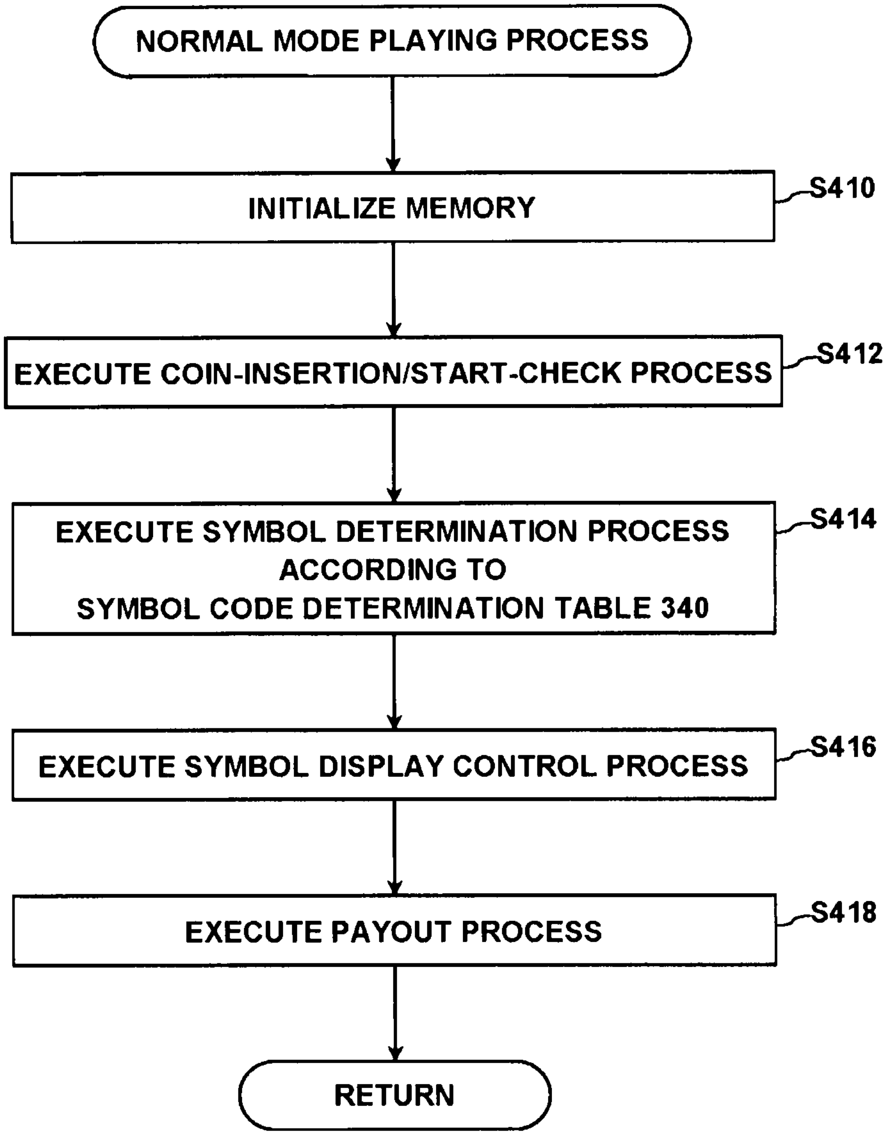
FIG. 16 is a flowchart showing the normal mode gaming process.

FIG. 16 shows the normal mode gaming process, step 402 shown in FIG. 15, in detail.

Whenever one game is completed, the main CPU 222 carries out memory initialization process (step 410). In this initialization process, the main CPU 222 clears unnecessary data, from the temporary working space of the RAM 226, such as the payout data, awarding or failure information, and the to-be-stopped symbol information determined in the previous game. Such a process secures the RAM 226 and the slot machine 10 from memory hacking or malfunction of the machine.

Subsequently, the main CPU 222 executes coin-insertion/start-check process (step 412). In this process, the main CPU 222 checks the entry of coins or bills, and scans inputs from the BET buttons 74-78 and the START button 79.

After the START button 79 is pressed by the player, the main CPU 222 executes symbol determination process (step 414). In this process, the main CPU 222 generates five random numbers and determines five codes of five to-be-stopped symbols corresponding to the random numbers with reference to the symbol code determination table 340. Also, the main CPU 222 determines whether or not any winning combination is established in the rearranged symbol matrix.

In step 416, the main CPU 222 executes symbol display control process. In this process, the main CPU 222 controls the reel assembly 50 to rotate and then stop the rotation so as to display the arrangement of symbol matrix on the display window 56 according to the determination result of the symbol determination process.

Finally, in step 418, the main CPU 222 executes payout process to determine the payout amount and provide the player with the determined payout amount.

Figure 17:
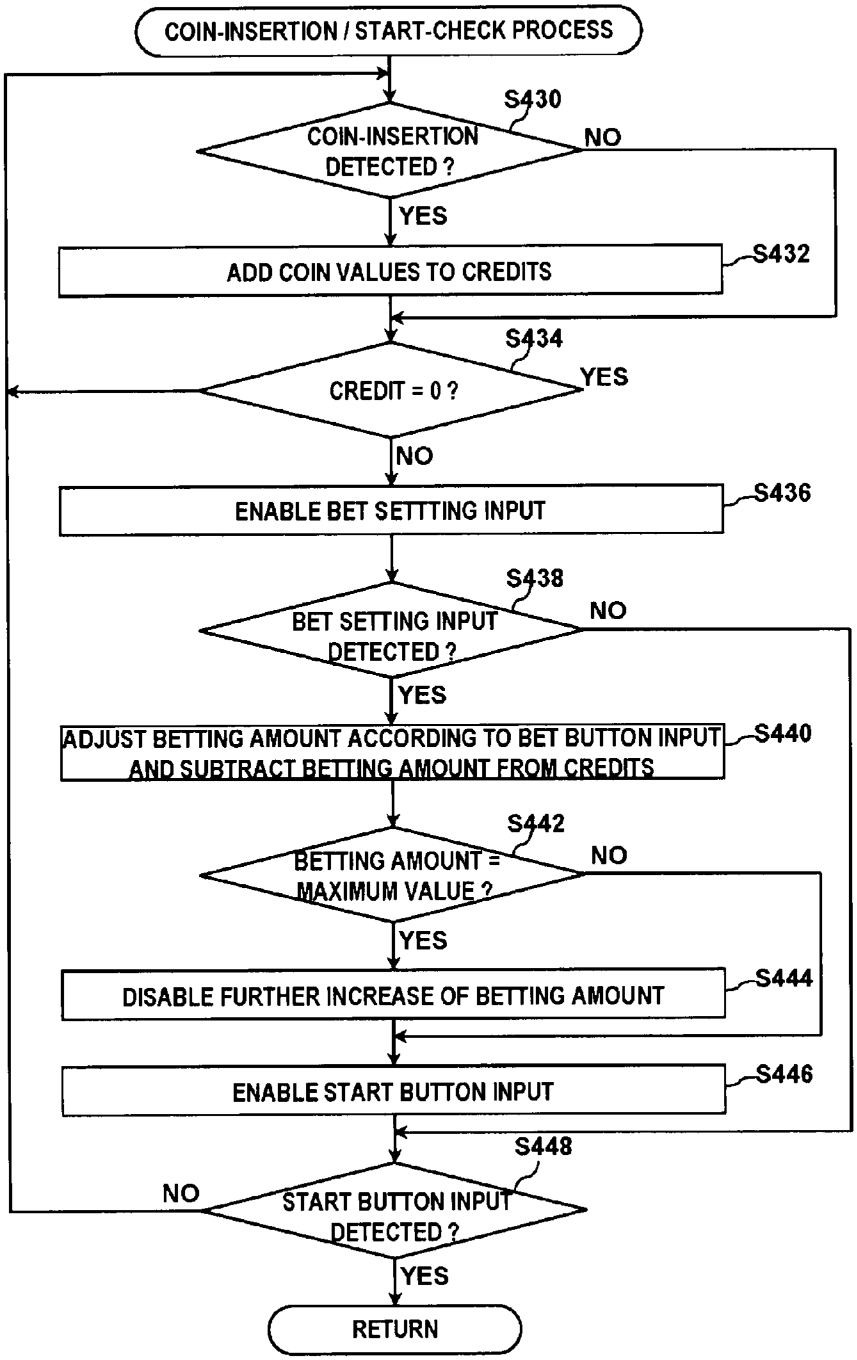
FIG. 17 is a flowchart showing the coin-insertion/start-check process shown in FIG. 16 in detail.

FIG. 17 illustrates the coin-insertion/start-check process, step 412 shown in FIG. 16, in detail.

First, the input/credit checking function 300 executed in the main CPU 222 the main CPU 222 (abbreviated as "the main CPU 222" hereinbelow) determines whether or not the coin counter 232 detects insertion of a coin (step 430). When determining in the step 430 that a coin has been inserted, the main CPU 222 adds the value of the inserted coin to the credits stored in the RAM 226 (step 432). At this stage, the main CPU 222 may further determine whether or not the bill validator 246 detects insertion of a bill. When determining that a bill has been inserted, the main CPU 222 adds the value of the inserted bill to the credits.

When the process of the step 432 has been completed or when it is determined in the step 430 that no coin has been inserted, the main CPU 222 determines whether or not the credit amount is zero (step 434). If it is determined in the step 434 that there remains some credits, the main CPU 222 enables the bet setting inputs through the BET buttons 34-38 under the limit of the remaining credits (step 436). If, however, it is determined in the step 434 that there remains no credit, the procedure returns to the step 430.

Afterwards, main CPU 222 monitors the bet setting input through the BET buttons 74-78 based on bet setting input signals from the bet switches 74S-78S (step 438). If the main CPU 222 determines that one of the BET buttons 74-78 has been pressed by the user, the main CPU 222 adjusts the betting amount value stored in the RAM 226 according to the pressed BET button and subtracts the betting amount from the credit value stored in the RAM 226 (step 440). If, however, it is determined in the step 434 that there is no BET button input for a certain time, the procedure proceeds to step 448.

During the increase of the betting amount, the main CPU 222 determines whether or not the betting amount reaches a predetermined maximum value (step 442). When the betting amount has reached the predetermined maximum value, the main CPU 222 disables any further increase of the betting amount (step 444).

When the process of the step 444 has been completed, or when it is determined that betting amount has not reached the maximum value in the step 442 and the betting amount is adjusted, the main CPU 222 enables the operation input through the START button 79 (step 446). At this stage, the main CPU 222 may display preset pay lines the symbol display unit.

In step 448, the main CPU 222 determines whether or not the input through the START button 79 is detected (step 448). When the input from the START button 79 has not been detected for a certain standby time, the procedure returns to the step 430. If, however, it is determined in the step 448 that the input from the START button 79 has been detected, the main CPU 222 terminates the coin-insertion/start-check process.

Figure 18:
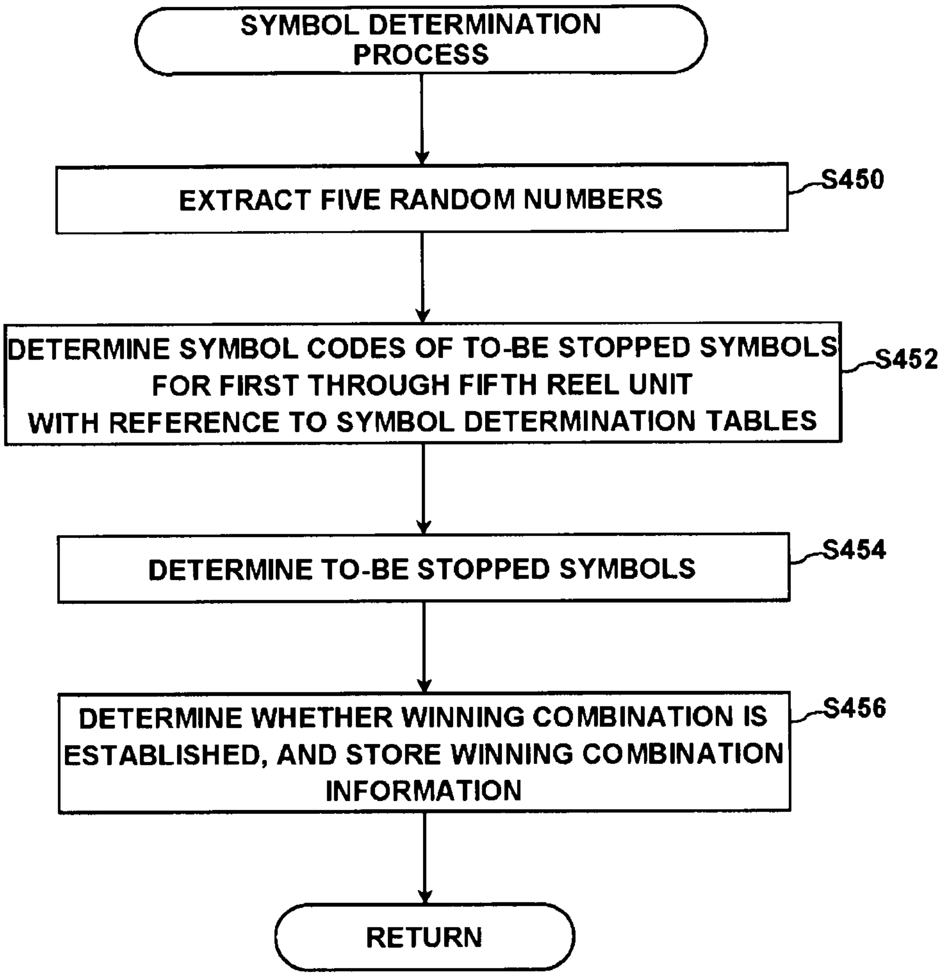
FIG. 18 is a flowchart showing the symbol determination process shown in FIG. 16 in detail.

FIG. 18 illustrates the symbol determination process, step 414 shown in FIG. 16, in detail.

First, the random number generation function 302 executed in the main CPU 222 extracts five random numbers (step 450).

Subsequently, the symbol determination function 304 executed in the main CPU 222 determines first through fifth symbol codes using first through fifth random numbers, respectively, with reference to the symbol code determination table 340 (step 452). Then, the main CPU 222 determines first through fifth to-be-stopped symbols corresponding to the first through the fifth symbol codes, respectively, with reference to the symbol code table shown in FIG. 6 (step 454). As a result, five to-be-stopped symbols are determined by use of the five random numbers. Upon determination of the first through the fifth to-be-stopped symbols, the main CPU 222 stores the symbols or symbol codes in the RAM 226.

The five to-be-stopped symbols are symbols to be stopped at the second row of each column of the symbol matrix shown in FIG. 8. Since the symbol patterns are fixed on each of the reels 52A-52E, the to-be-stopped symbols determines all the symbols in the symbol matrix. The main CPU 222 determines the symbol arrangements of the symbol matrix based on the to-be-stopped symbols with reference to the symbol code table of FIG. 6 (step 456).

Afterwards, the winning determination function 310 executed in the main CPU determines whether any wining combination is established in the arranged symbol matrix (step 458). In case that a winning combination is established in the symbol matrix, the winning determination function 310 stores the winning combination in the RAM 226. Alternatively, the main CPU 222 may check the establishment of the wining combination directly from the symbol codes of to-be-stopped symbols without determination of the symbol matrix.

Finally, the symbol determination process terminates and the execution flow returns to the main function (not shown in the drawings).

Figure 19:
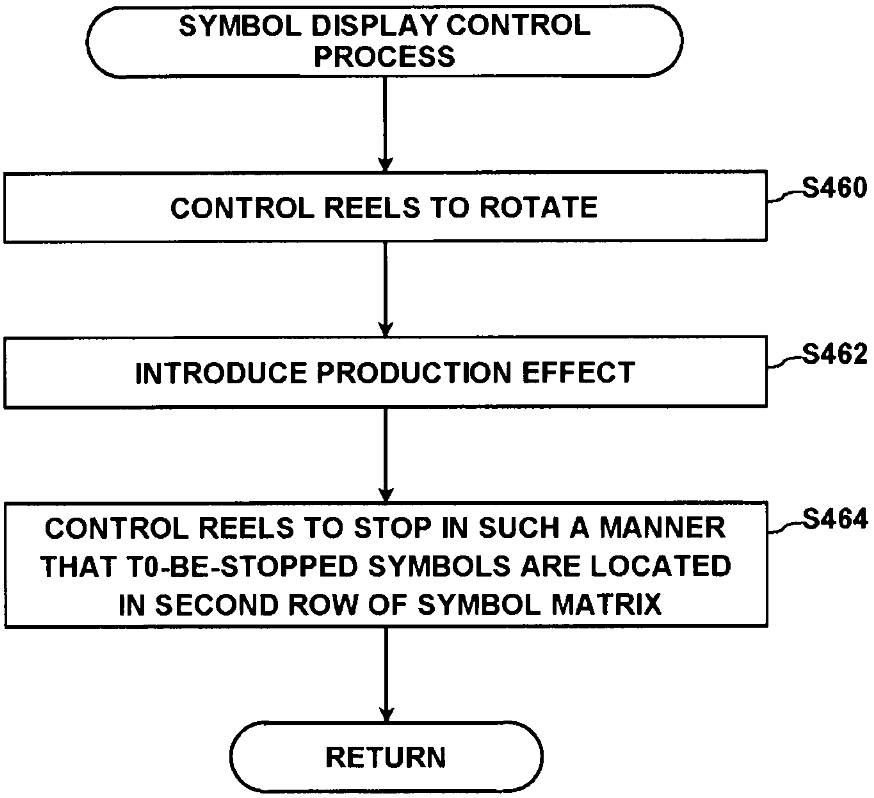
FIG. 19 is a flowchart showing the symbol display control shown in FIG. 16 in detail.

FIG. 19 illustrates the symbol display control process, step 416 shown in FIG. 16, in detail.

First, the reel control function 308 executed in the main CPU 222 transmits a spin control signal to the reel assembly 50 so that the reel driver 264 of the first through the fifth reel units 52A-52E supplies electric power to the reel motor 272 to rotate the reels. Accordingly, the reels spin in respective speed different from one another, and the symbol pattern marked on the reels scrolls in the display window 56 of the symbol display unit 40 (step 460).

While the reels spin, the main CPU 222, the backlight driver 266 supplies electric power to the light sources 282 of the backlight device 280 and the illumination driver 268 supplies power to the light source 292 of the performance light illumination device 290 to introduce a certain performance effect from behind the reel surfaces (step 462).

The spin control signal contains information of stop positions of the reels. The reel driver 264 of the reel units 52A-52E controls the reel motors 272 to stop at the position indicated by the spin control signal. Thus, the reel motors 272, which is implemented by stepping motors, stop in desired positions, and the symbol columns stops the scroll so that the to-be-stopped symbols are located in the second row of the symbol matrix formed in the display window 56 (step 464).

Finally, the symbol display control process terminates and the execution flow returns to the main function.

Figure 20:
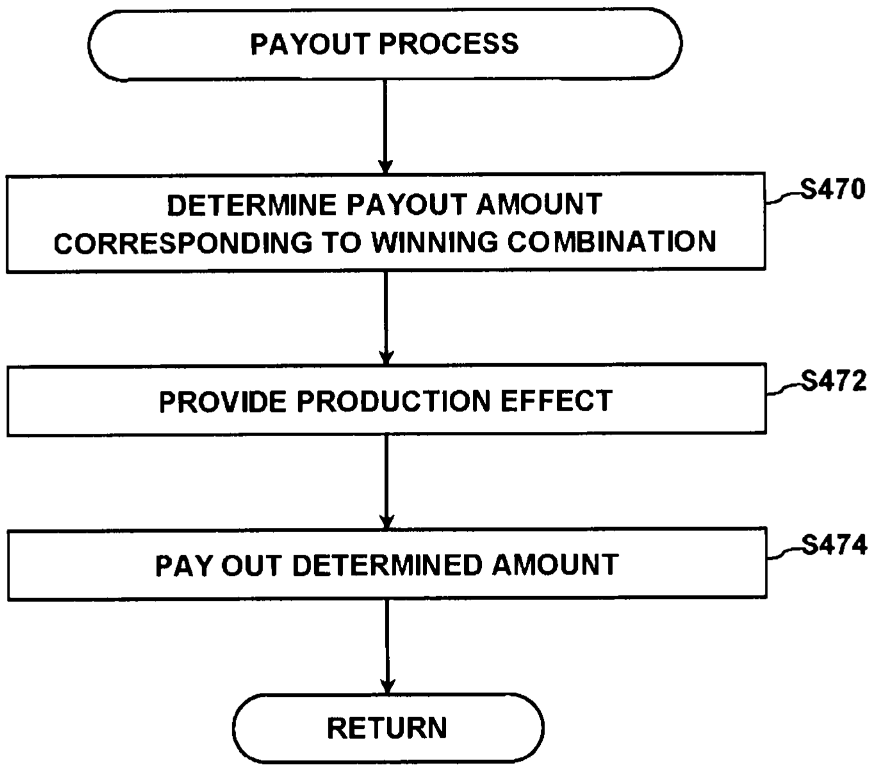
FIG. 20 is a flowchart showing the payout process shown in FIG. 16 in detail.

FIG. 20 illustrates the payout process, step 418 shown in FIG. 16, in detail.

When a winning combination is established, the winning determination function 310 or the payout function 314 being executed in the main CPU 222 determines the payout amount corresponding to the winning combination and stores the amount in the RAM 226 (step 470).

As soon as the reels stop, the production effect control function 312 executed in the main CPU 222 controls the symbol display unit 40 and the other devices such as the speaker 112, the lamp 114, and the video display unit 110 to provide production effect (step 472). The production effect includes video and audio effect, backlight change, and lighting effect.

Afterwards, the payout function 314 payouts the determined amount by increasing the credits or discharging coins to the coin tray 90 (step 474).

Figure 21A:
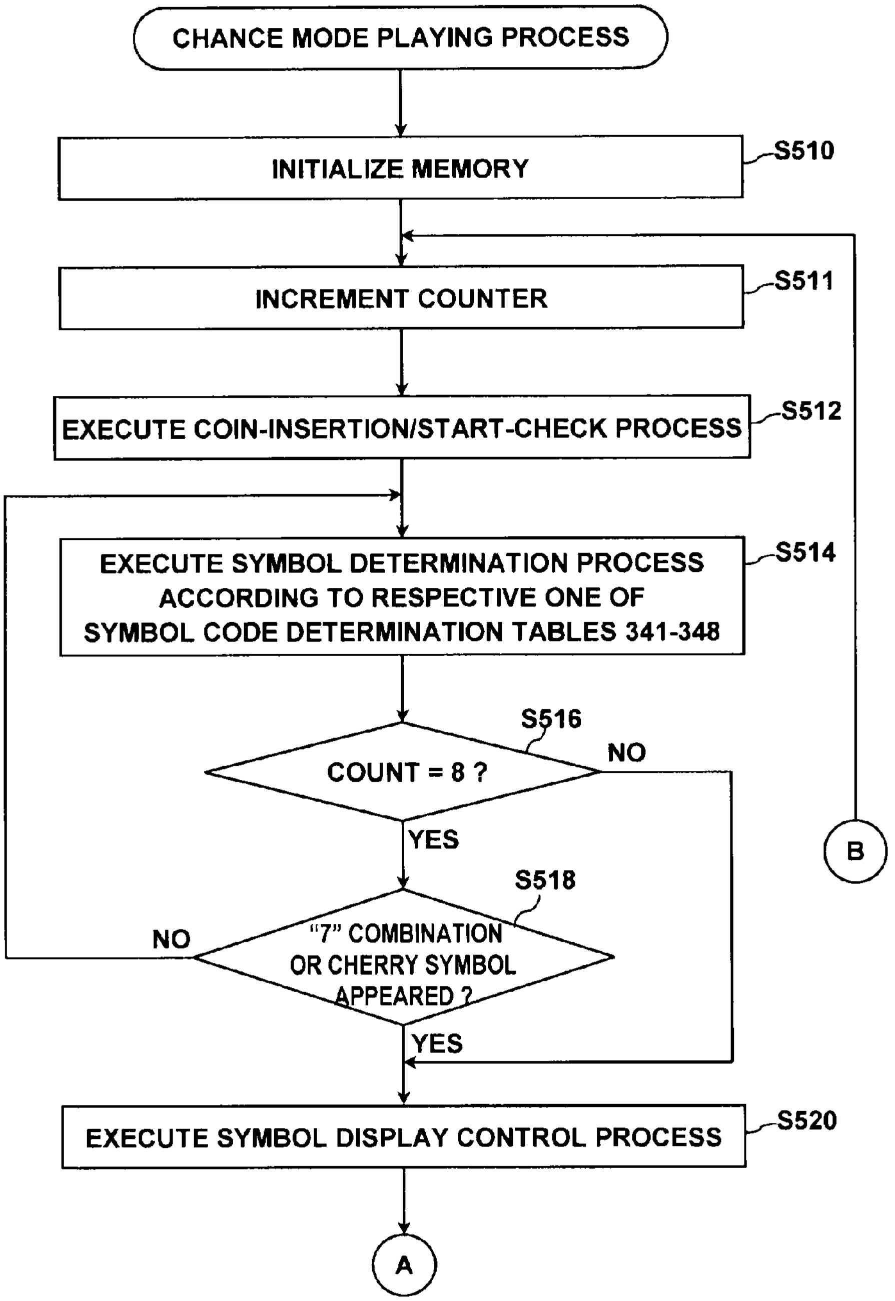
FIGS. 21A and 21B are flowcharts showing the chance mode gaming process.
Figure 21B:
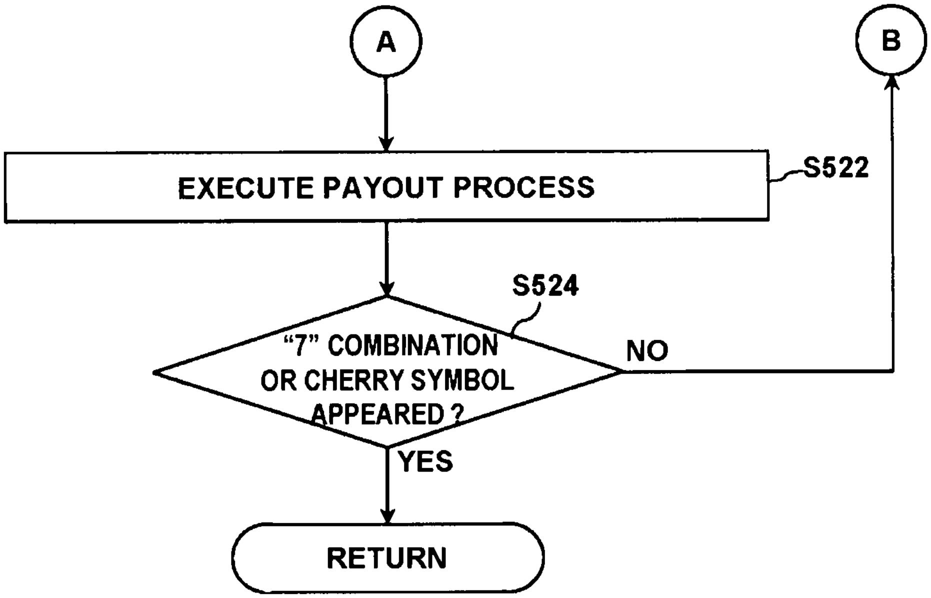

FIGS. 21A and 21B show the chance mode gaming process (step 408) along with the exit condition determining process (step 409) shown in FIG. 15 in detail.

Whenever one game is completed, the main CPU 222 carries out memory initialization process (step 510). The main CPU 222 clears unnecessary data, from the temporary working space of the RAM 226, such as the payout data, awarding or failure information, and the to-be-stopped symbol information determined in the previous game. Such a process secures the RAM 226 and the slot machine 10 from memory hacking or malfunction of the machine.

In step 511, the main CPU 222 increments the count value of the counter which indicates the sequential number of the chance mode game being performed. Since the count value is initially set to zero, the count value is set to one in the first chance mode game.

Subsequently, the main CPU 222 executes coin-insertion/start-check process (step 512). In this process, the main CPU 222 checks the entry of coins or bills, and scans inputs from the BET buttons 74-78 and the START button 79.

After the START button 79 is pressed by the player, the main CPU 222 executes symbol determination process (step 514). In this process, the main CPU 222 first generates five random numbers. Then, the symbol determination function 304 executed in the main CPU 222 determines first through fifth symbol codes using first through fifth random numbers, respectively, with reference to one of the symbol code determination tables 341-348. When the first chance mode game is being performed, the symbol code determination table 341 is applied in determining the symbol codes. When the second chance mode game is being performed, the symbol code determination table 342 is applied in determining the symbol codes. Similarly, when the other first chance mode games are being performed, respective one of the symbol code determination tables 343-348 is applied in determining the symbol codes.

Afterwards, the main CPU 222 determines first through fifth to-be-stopped symbols corresponding to the first through the fifth symbol codes, respectively, with reference to the symbol code table shown in FIG. 6. As a result, five to-be-stopped symbols are determined by use of the five random numbers. Upon determination of the first through the fifth to-be-stopped symbols, the main CPU 222 stores the symbols or symbol codes in the RAM 226.

Then, the winning determination function 310 executed in the main CPU determines whether any wining combination is established in the arranged symbol matrix. In case that a winning combination is established in the symbol matrix, the winning determination function 310 stores the winning combination in the RAM 226.

In step 516, the main CPU 222 checks whether the game count value reached eight, which number indicates that the last chance mode game is being performed. If it is determined that the game count value has reached eight, the main CPU 222 determines whether or not the exit condition is satisfied (step 518). The exit condition is the appearance of one of winning combinations comprised of the 'SEVEN' symbol in one of the pay lines. Another exit condition is the appearance of the 'CHERRY' symbol in the one of the pay lines.

In case that the game count value has reached eight but neither a winning combination comprised of the 'SEVEN' symbol nor the 'CHERRY' symbol has appeared in the one of the pay lines, the procedure returns to the step 514 so that the main CPU 222 execute the step 514 again. Thus, the appearance of a winning combination comprised of the 'SEVEN' symbol or the 'CHERRY' symbol is ensured in the step 518.

Meanwhile, if it is determined that the game count value has not reached eight in the step 516, or neither the winning combination comprised of the 'SEVEN' symbol nor the 'CHERRY' symbol has appeared in the step 518, the procedure continues to step 520.

In the step 520, the main CPU 222 executes symbol display control process so as to control the reel assembly 50 to rotate and then stop the rotation. Accordingly, the arrangement of symbol matrix is displayed on the display window 56 according to the determination result of the symbol determination process. In step 522, the main CPU 222 executes payout process to determine the payout amount and provide the player with the determined payout amount.

In step 524, the main CPU 222 determines again whether or not the exit condition is satisfied. If the exit condition is satisfied, the main CPU 222 terminates the chance mode playing process. If, however, it is determined in the step 524 that the exit condition is not satisfied, the procedure returns to the step 511 to increment the game count and perform another chance mode game.

As described above, the chance mode games continue until a winning combination comprised of the 'SEVEN' symbol or the 'CHERRY' symbol appears in at least one of the pay lines LINE1-LINE5. Also, if the chance mode games have been performed in a certain maximum number, the main CPU 222 ensures that the exit condition is assuredly satisfied.

In a preferred embodiment, the probability that the winning combination comprised of the 'SEVEN' symbol appears in the chance mode is larger than the normal mode. In particular, as the chance mode progresses, the probability that the winning combination comprised of the 'SEVEN' symbol appears gradually increases. Further, the probability is 100% in the eighth chance mode game. However, the probabilities of the other winning combinations may decrease to some extent compared with the normal mode. On the other hand, it is preferable that all the pay lines LINE1-LINE5 are activated in the chance mode regardless of the betting amount.

A few video and/or audio effects may be provided to the player to inform that the gaming mode is chance mode. For example, a word "CHANCE" may be displayed in the video display unit 110, the display panel 58 of the symbol display unit 40, or another lighting board. The backlight may be brighter or darker than the normal mode. Also, the button sound of the START button 79 may have a higher tone. The reel stopping sound may have shortened interval.

Second Embodiment of Gaming Machine

In the embodiments described above, the winning combination determination function 310 executed in the main CPU 222 determines the winning combination based only on the number of identical symbols in any one of the active pay lines. In an alternative embodiment, however, the symbol columns provided by the reel units 52A-52E may contain a kind of 'WILD' symbol, and the winning combination determination function 310 may determine the establishment of the winning combination taking the 'WILD' symbol into account.

FIG. 22 illustrates another example of the symbol code table suitable for such an embodiment of the present invention. The slot machine according to the second embodiment of the present invention which employs the symbol code table shown in FIG. 22 is similar to the first embodiment shown in FIGS. 1 through 21B except the configuration of symbol columns, the tables stored in the RAM 226, and game programs executed in the main CPU 222 (particularly, the symbol determination function 304, the winning combination function 310, and the payout function 314). The features and advantages of the slot machine according to the second embodiment will now be described in view of the differences from the first embodiment.

According to the present embodiment, the symbol columns marked on the reels 52A-52E include seven types of symbols: 'SEVEN', 'BAR', 'DOUBLE BAR', 'TRIPLE BAR', 'CHERRY', 'CHANCE CHERRY', and 'WILD' symbols. Each symbol column consists of eleven symbols. In each of the symbol columns, each symbol is assigned a code ranging from "00" to "10."

Three consecutive symbols in each symbol column can be exposed through the window 56 of the symbol display unit 40 to arrange a symbol matrix having three rows and five columns. Each time the BET buttons 74-78 or the START button 79 is pressed, the symbol-bearing reels 52A-52E starts to spin so that the symbols exposed through the window 56 scrolls vertically. After a certain time period elapses, the scrolls of the symbol columns stop simultaneously or sequentially to rearrange the symbol matrix.

The 'CHANCE CHERRY' symbol appearing only in the third symbol column works as a trigger symbol which triggers the entry of the gaming mode into the chance mode. In the present embodiment, the 'CHANCE CHERRY' symbol generally has a shape similar to the common 'CHERRY' symbol, but has a ribbon or band put in the bottom and inscribed with a word, "CHANCE." However, the present invention is not limited by a particular shape of the 'CHANCE CHERRY' symbol, and the symbol shown in FIG. 6 might be used as well. The chance mode is initiated after the 'CHANCE CHERRY' symbol appears in the position of the second row and third column similarly to the embodiments above.

The 'WILD' symbol, which preferably is disposed in the entire symbol columns, includes a star-shaped figure and a word, "WILD," located beneath the figure. In a preferred embodiment, the 'WILD' symbol has three advantageous functions: establishment of its own winning combination, substitution to another symbol type to combine with another symbol and establish a winning combination, and multiplication factor for payout amount, which are described in detail below.

FIG. 23 illustrates an example of payout tables suitable for the second embodiment of the present invention. Among the payout tables 380A-388A, the table 380A is dedicated for the normal mode game, and the tables 381A-388A are applicable for the first through the eighth chance mode games, respectively. All the payout tables 380-388 might be integrated into a single table as well. As can be seen in FIG. 23, the 'WILD' symbol can establish its own winning combinations. Specifically, five 'WILD' symbols in a single pay line constitute a "TOP AWARDING" combination. Also, four 'WILD' symbols in the four leftmost columns along a pay line constitute a winning combination resulting in payout of one thousand and two hundred times, and three 'WILD' symbols in the three leftmost columns along a pay line constitute a winning combination resulting in payout of six hundred times.

Meanwhile, when the 'WILD' symbol is disposed in an active pay line, the 'WILD' symbol can be regarded as another symbol advantageous to the player. In other words, in case that the substitution of the 'WILD' symbol to another symbol brings about a winning combination or a higher payout amount, the 'WILD' symbol is used as the desired symbol necessary for the winning combination. Thus, the 'WILD' symbol can act as a substitute for any other symbol in the system.

Figure 24:
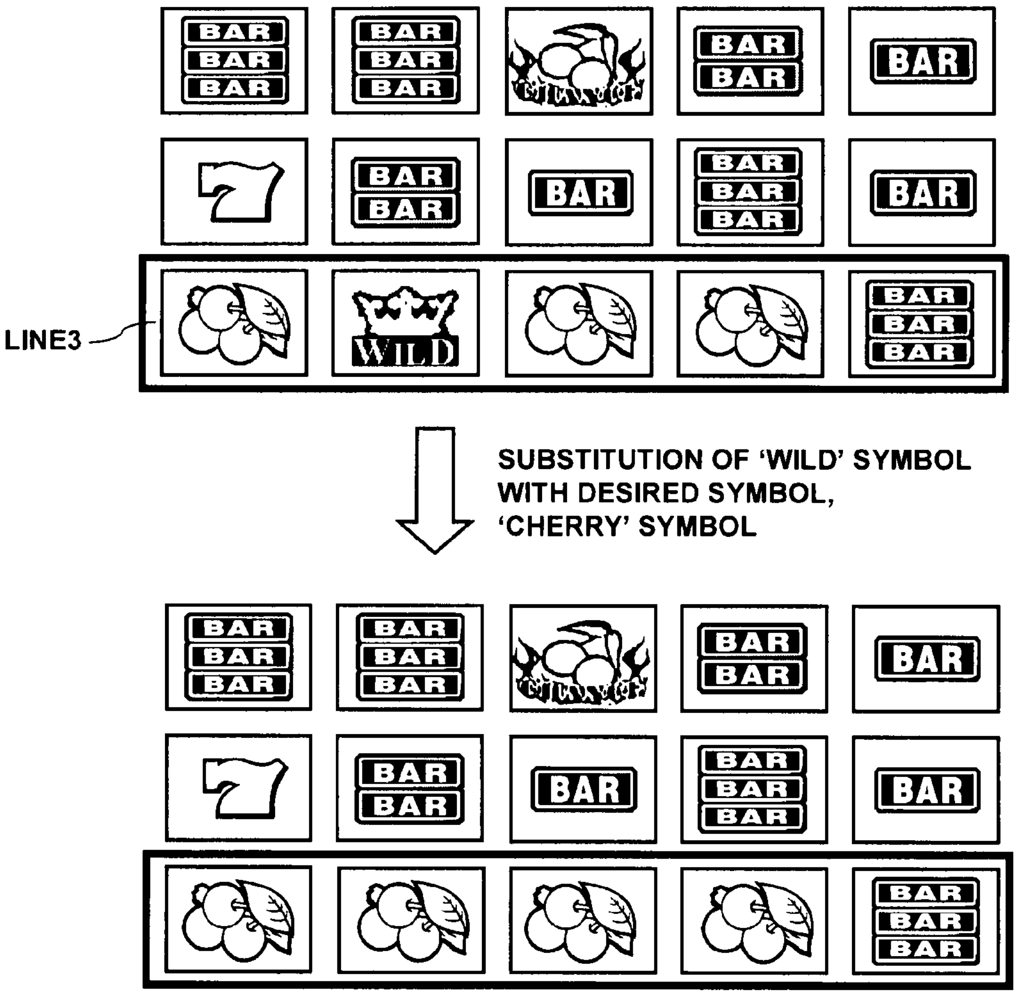
FIG. 24 illustrates an example of substitution function of the 'WILD' symbol.

FIG. 24 shows an example of the substitution function of the 'WILD' symbol. In the drawing, it is assumed that a winning combination consisting of three 'CHERRY' symbols is established in the third pay line (LINE3) and a 'WILD' symbol is disposed in the pay line (LINE3). Unless the 'WILD' symbol is disposed in the pay line, the payout would be fifteen times the bet according to the payout table 380A shown in FIG. 23. When the 'WILD' symbol is disposed in the pay line as shown in FIG. 24, the 'WILD' symbol is substituted by the 'CHERRY' symbol to change the winning combination into 'FOUR CHERRIES' combination and increase the payout to thirty times the bet.

On the other hand, when plural 'WILD' symbols are disposed in a pay line in which a winning combination is arranged, the main CPU 222 multiplies the payout amount or payout rate by a weighting factor corresponding to the number of 'WILD' symbols. FIG. 25 summarizes the multiplication factors provided by the 'WILD' symbol. When one 'WILD' symbol is disposed along a pay line in which a winning combination is established, the payout rate fixed for a common condition is paid out as it is. However, in case that two 'WILD' symbols are disposed along the pay line in which the winning combination is established, the payout amount is calculated by multiplying the fixed amount by two. If three 'WILD' symbols are disposed along the pay line in which the winning combination is established, the payout amount is calculated by multiplying the fixed amount by three. If four 'WILD' symbols are disposed along the pay line, the payout amount is calculated by multiplying the fixed amount by four. If five 'WILD' symbols are disposed along a pay line, the multiplication factor is meaningless because the payout amount for this combination is more valuable. Thus, a top awarding of two thousand and five hundred times payout is provided to the player in this case.

FIG. 26 shows an example of the multiplication of the payout amount. In the drawing, it is assumed that a winning combination consisting of two 'CHERRY' symbols is established in the third pay line (LINE3) and two 'WILD' symbols are disposed in the pay line (LINE3). The 'WILD' symbols induce a multiplication factor of two, and thus the fixed payout rate for the "TWO CHERRIES" combination, six, is multiplied by the multiplication factor to yield a actual payout rate of twelve.

The probabilities that winning combinations including the 'WILD' symbols may change as the chance mode games continue. FIG. 27 shows such an embodiment. In the embodiment of FIG. 27, the probabilities of winning combinations associated with the 'WILD' symbol increase as the chance mode game go on. As can be seen in the upper table in FIG. 27, the probability that the winning combination of "THREE WILD" combination is established increases as the chance mode games continue. In other words, the probability of the "THREE WILD" combination in the second game is higher than that in the first game. Also, the probability in the third game is higher than that in the second game. In such a manner, the probability of the "THREE WILD" combination gradually increases until the last game is reached. The similar are the other winning combination of "FOUR WILD" and "FIVE WILD."

As a result, the total probability of the winning combinations related with "WILD" symbol increases as the chance mode game is repetitively carried out. In the example shown in the drawing, the probabilities of the "THREE WILD," "FOUR WILD," and "FIVE WILD" combinations are 1/147.9, 1/3,759.5, and 1/143,093.7, respectively, in the first chance mode game. Thus, the total probability of the 'WILD' symbol-related combinations is 1/142.2 (=1/147.9+1/3,759.5+1/143,093.7) in the first chance mode game. The total probability increases to 1/133.3 in the second game, and continues to increase to 1/49.2 in the eighth game.

Of course, the 'WILD' symbol can be used as the specific symbols along with the 'CHERRY' and 'SEVEN' symbols. When the 'WILD' symbol is used as the specific symbols along with the 'CHERRY' and 'SEVEN' symbols, the probabilities that winning combinations including the specific symbols appear in the symbol matrix increase as the chance mode games continue and the chance mode exits when one of such winning combinations is established. Since the meaning of the specific symbols and their function in enhancing the entertainingness and causing the exit condition are similar to those of the first embodiment were described above with reference to FIG. 14, detailed description thereof will be omitted.

On the other hand, while the probability that the 'WILD' symbol appears increases as the unit games continue in the above description, the probability may change increase or decrease according to a predetermined manner without gradually increasing as the games continue in the chance mode as well as in the normal mode. FIG. 28 shows an example that the probability of the 'WILD' symbol appearance decreases as the games go on. In the example shown in the drawing, probability of the 'WILD' symbol appearance gradually decreases from 1/2.7 in the first chance mode game to 1/3.2 in the second game, but increases again to 1/3.0 in the third chance mode game. The probability may change in the same manner in the normal mode also to enhance the unpredictability of the game.

Meanwhile, the probability of the 'WILD' symbol appearance may be smaller in chance mode games than in the normal mode games, as is the case shown in FIG. 28, regardless that the 'WILD' symbol is the specific symbol or not.

Figure 29:
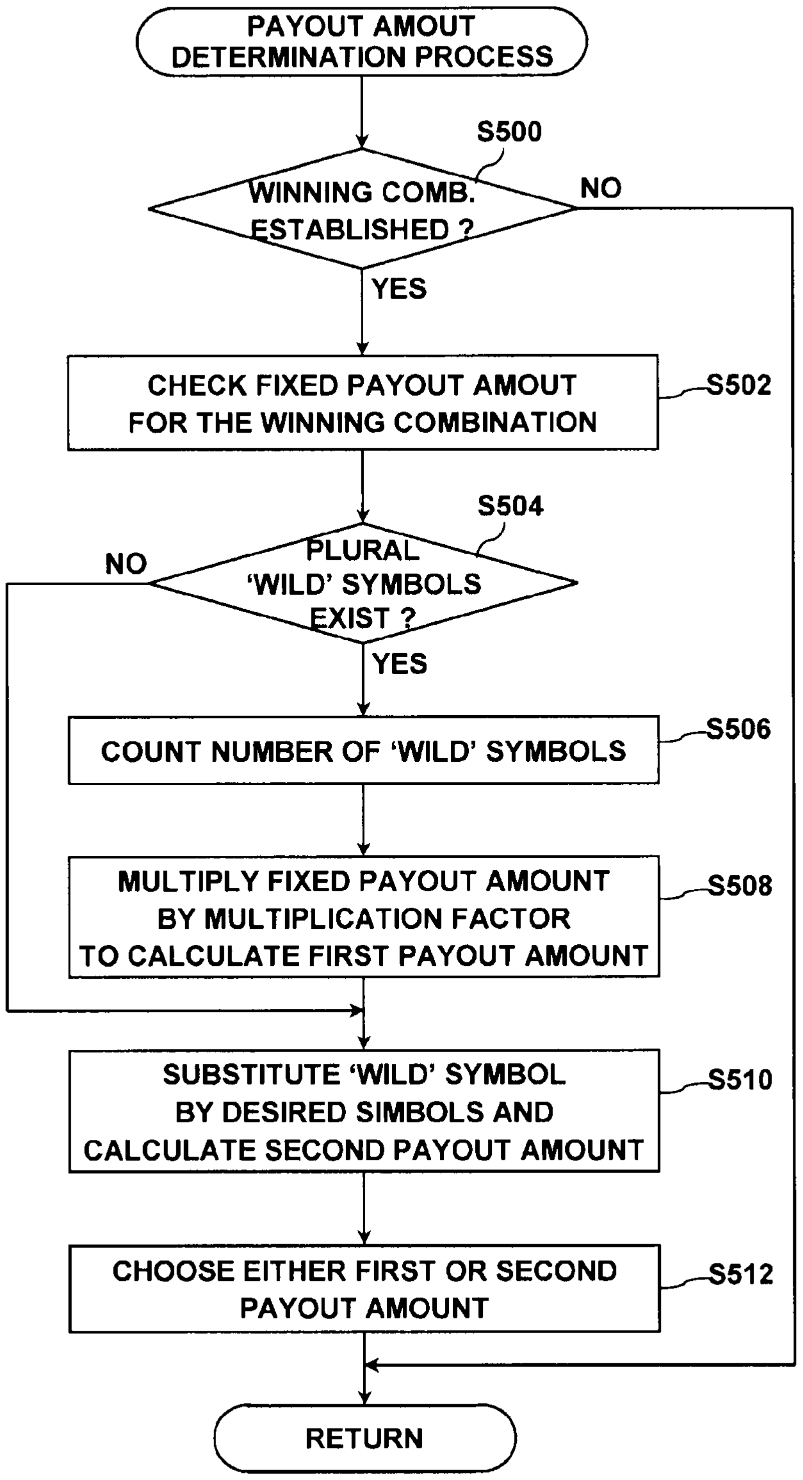
FIG. 29 is a flowchart showing a payout amount determination process according to the second embodiment of the present invention.

FIG. 29 illustrates a payout amount determination process according to the present embodiment, which is a modified process of the step 470 shown in FIG. 20.

Each time the game is performed, the winning determination function 310 included in the game program and executed by the main CPU 222 determines whether any winning combination is established in the pay lines (step 500). In case that a winning combination is included in one of the pay lines, the winning determination function 310 detects the winning combination and checks the payout amount corresponding to the winning combination with reference to the payout tables 380A-388A (step 502).

At this time, the winning determination function 310 checks whether plural 'WILD' symbols exist in the pay line in which the winning combination is established (step 504). In the case that there is no 'WILD' symbol or just a single 'WILD' symbol in the pay line, the procedure proceeds to step 510.

On the other hand, if it is determined in the step 504 that there is plural 'WILD' symbols in the pay line, the winning determination function 310 counts the number of the 'WILD' symbols in the pay line (step 506). Afterwards, the winning determination function 310 multiplies the payout amount obtained in the step 502 by the multiplication factor corresponding to the number of the 'WILD' symbols to calculate a first payout ratio (step 508).

In step 510, the winning determination function 310 substitutes the 'WILD' symbols by desired symbols and calculates a second payout ratio based on the substitution.

In step 512, the winning determination function 310 determines either the first or the second payout ratio which is larger as a final payout ratio.

Though it was described in FIG. 29 that both the multiplication factor corresponding to the number of the 'WILD' symbols and the substitution of the 'WILD' symbol by a desired symbol are considered in the description above, either the multiplication factor or the substitution can be performed alternatively.

In yet another embodiment, the symbol column marked in the leftmost reel 52A may not include the 'WILD' symbol. In such a case, the 'WILD' symbols do not generate its own winning combinations such as "TWO WILDS," "THREE WILDS," "FOUR WILDS," AND "FIVE WILDS" combinations, but contributes to the multiplication factor or the substitution of another symbols.

Although the present invention has been described in detail above, it should be understood that the foregoing description is illustrative and not restrictive. Those of ordinary skill in the art will appreciate that many obvious modifications can be made to the invention without departing from its spirit or essential characteristics Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. Accordingly, it should be considered that claims cover equivalent structures, too, without departing from the technical idea of the present invention. An object of the abstract is to enable an intellectual property office, general public institutions, persons belonging to the art but not familiar with patent, legal terms, or technical terms to quickly understand technical contents and essences of the present invention through a simple research. It is therefore not an intention of the abstract to limit the scope of the present invention which shall be construed on the basis of the description of the claims. In addition, it is desirable to sufficiently refer to already-disclosed documents and the like, in order to fully understand the objects and effects of the present invention.

The detailed description provided above includes a processing which is executed on a computer or a computer network. The descriptions and expressions provided above are given for the purpose of allowing those skilled in the art to understand the invention most effectively. A process executed in or by respective steps yielding one result or blocks with a predetermined process function described in the present specification shall be understood as a process with no self-contradiction. In addition, in each step or block, an electrical or magnetic signal is transmitted/received, recorded, and the like. In a processing in each step or block, such a signal is embodied in the form of a bit, a value, a symbol, a character, a term, a number, and the like. However, it should be noted that they have been used simply because they are convenient for explanations. A processing in each step or block has sometimes been described using an expression which is common to a human behavior. However, in principle, the processing described in the specification is executed by various devices. In addition, other structures necessary for each step or block are apparent from the above description.

What is claimed is:

1. A gaming machine comprising:

a symbol display unit that displays a plurality of reels including a plurality of symbols, the plurality of symbols including a specific symbol;

a memory that stores plural kinds of data including data controlling an appearance probability of the specific symbol and program data for executing a game; and a controller that reads out the plural kinds of data from the memory, executes a normal game mode based on the read-out data, and executes a continuation game mode based on the symbols displayed to the symbol display unit as a result of a rearrangement of the plurality of reels in the normal game mode, wherein the appearance probability that the specific symbol will be displayed to the symbol display unit as a result of a rearrangement of each of the plurality of reels in the continuation game mode is increased relative to the normal game mode and is increased as a number of successively executed continuation games in the continuation mode increases, and wherein the controller is programmed to rearrange each of the plurality of reels in each of the successively executed continuation games.

2. The gaming machine of claim 1, wherein:

the symbol display unit displays a game result by rearranging the plurality of symbols on the plurality of reels;

the memory stores data corresponding to a first symbol determination table that causes the specific symbol to appear among the plurality of rearranged symbols on the plurality of reels on the symbol display unit with a first probability and a second symbol determination table that causes the specific symbol to appear among the plurality of rearranged symbols on the plurality of reels with a second probability higher than the first probability; and the continuation mode is a chance mode and the controller reads the data stored in the memory and executes a game in the normal game mode and shifts the normal game mode to the chance mode according to the game result in the normal game mode, wherein the controller is programmed to rearrange each of the plurality of reels in each game in the chance mode and execute processing of:

(A) when the game result in the normal game mode satisfies a shifting condition, execute a first chance mode game based on the first symbol determination table;

(B) when the specific symbol appears in an awardable form among the rearranged symbols in the first chance mode game executed in the processing (A), award a benefit and terminate the chance mode;

(C) when the specific symbol does not appear in the awardable form in the first chance mode game executed in the processing (A), execute a subsequent chance mode game based on the second symbol determination table; and (D) when the specific symbol appears in the awardable form among the rearranged symbols in the subsequent chance mode game executed in the processing (C), award the benefit and terminate the chance mode.

3. The gaming machine as claimed in claim 2, wherein the controller is configured to repetitively perform the processing (C) to execute a predetermined number of subsequent chance mode games until the specific symbol appears in the awardable form.

4. The gaming machine as claimed in claim 3, wherein the second symbol determination table includes a predetermined number of mapping rules, each for respective subsequent chance mode games, between random numbers and symbol codes, wherein the second probability increases higher and higher as a new subsequent chance mode game is executed.

5. The gaming machine as claimed in claim 2, wherein the symbol display unit comprises: a transparent window protecting the symbol display unit and indicating a possible position of the specific symbol that establishes the awardable form.

6. The gaming machine as claimed in claim 5, wherein the transparent window indicates at least one active pay line.

7. A gaming machine of claim 1, wherein:

the symbol display unit displays a game result by rearranging the plurality of symbols on the plurality of reels;

the memory stores data corresponding to a first symbol determination table that produces first probabilities corresponding to at least two specific symbols which establish bases for awardable forms and result in respective award benefits different from each other, a second symbol determination table that produces second probabilities corresponding to the at least two specific symbols that are higher than a respective one of the first probabilities and describes a case wherein the at least two specific symbols do not establish the awardable forms after a rearrangement of the plurality of symbols, and a third symbol determination table producing third probabilities corresponding to the at least two specific symbols that are higher than a respective one of the second probabilities and guaranteeing one of the awardable forms after the rearrangement of the plurality of symbols; and the continuation game mode is a chance mode and the controller reads the data stored in the memory and executes a game in the normal game mode, and sets a counter and shifts the normal game mode to the chance mode according to the game result in the normal game mode to execute games in the chance mode according to a game count set by the counter, wherein the controller is programmed to rearrange each of the plurality of symbols on each of the plurality reels in each game in the chance mode and execute processing of:

(A) when the game result in the normal game mode satisfies a shifting condition, execute a first chance mode game based on the first symbol determination table;

(B) when at least one of the at least two specific symbols appears in one of the awardable forms among the plurality of rearranged symbols on the plurality of reels in the first chance mode game executed in the processing (A), award a benefit and determining that a first termination condition is established to terminate the chance mode;

(C) when none of the at least two specific symbols appear in the awardable forms in the first chance mode game executed in the processing (A) and the game count does not reach a final value, execute a subsequent chance mode game based on the second symbol determination table;

(D) when at least one of the at least two specific symbol appears in one of the awardable forms in the subsequent chance mode game executed in the processing (C), award the benefit and determine that the first termination condition is established to terminate the chance mode; and (E) when the game count reaches the final value, determine that a second termination condition is established and execute a final chance mode game based on the third symbol determination table to rearrange the symbols.

8. The gaming machine as claimed in claim 7, wherein each of the awardable forms consists of a predetermined winning combination containing at least one of the at least two specific symbols, wherein the symbol display unit comprises:

a transparent window protecting the symbol display unit and indicates the possible position of the predetermined winning combination.

* * * * *